H. HOPKINS.
CALCULATING MACHINE.
APPLICATION FILED DEC. 12, 1908.

1,366,566.

Patented Jan. 25, 1921.
33 SHEETS—SHEET 1.

Witnesses:
George Ladson
A. S. McCauley

Inventor:
Hubert Hopkins.
By Bakewell Cornwall Attys

H. HOPKINS.
CALCULATING MACHINE.
APPLICATION FILED DEC. 12, 1908.
1,366,566.
Patented Jan. 25, 1921.
33 SHEETS—SHEET 2.
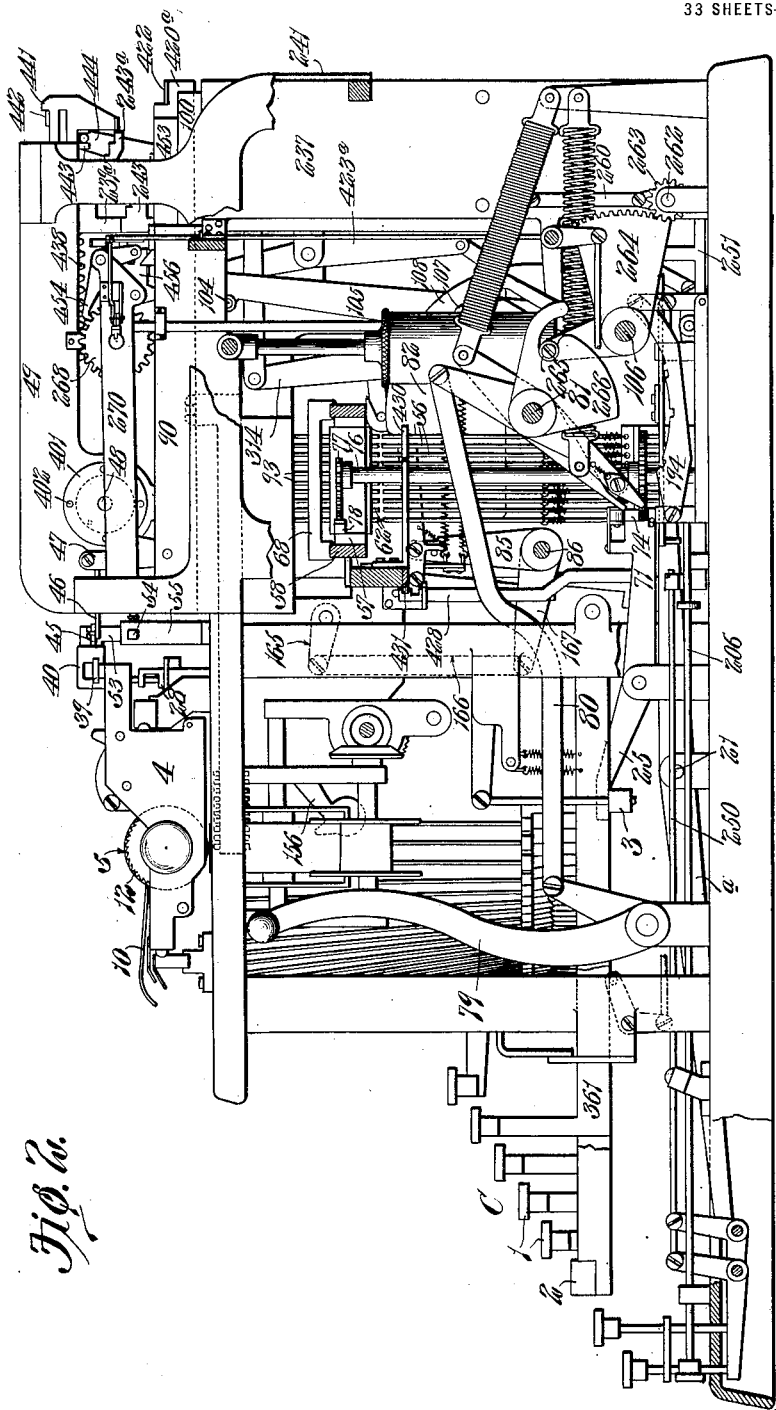
Witnesses:
George Ladsow.
A. J. McCauley.
Inventor,
Hubert Hopkins.
By Bakewell Cornwall Attys.

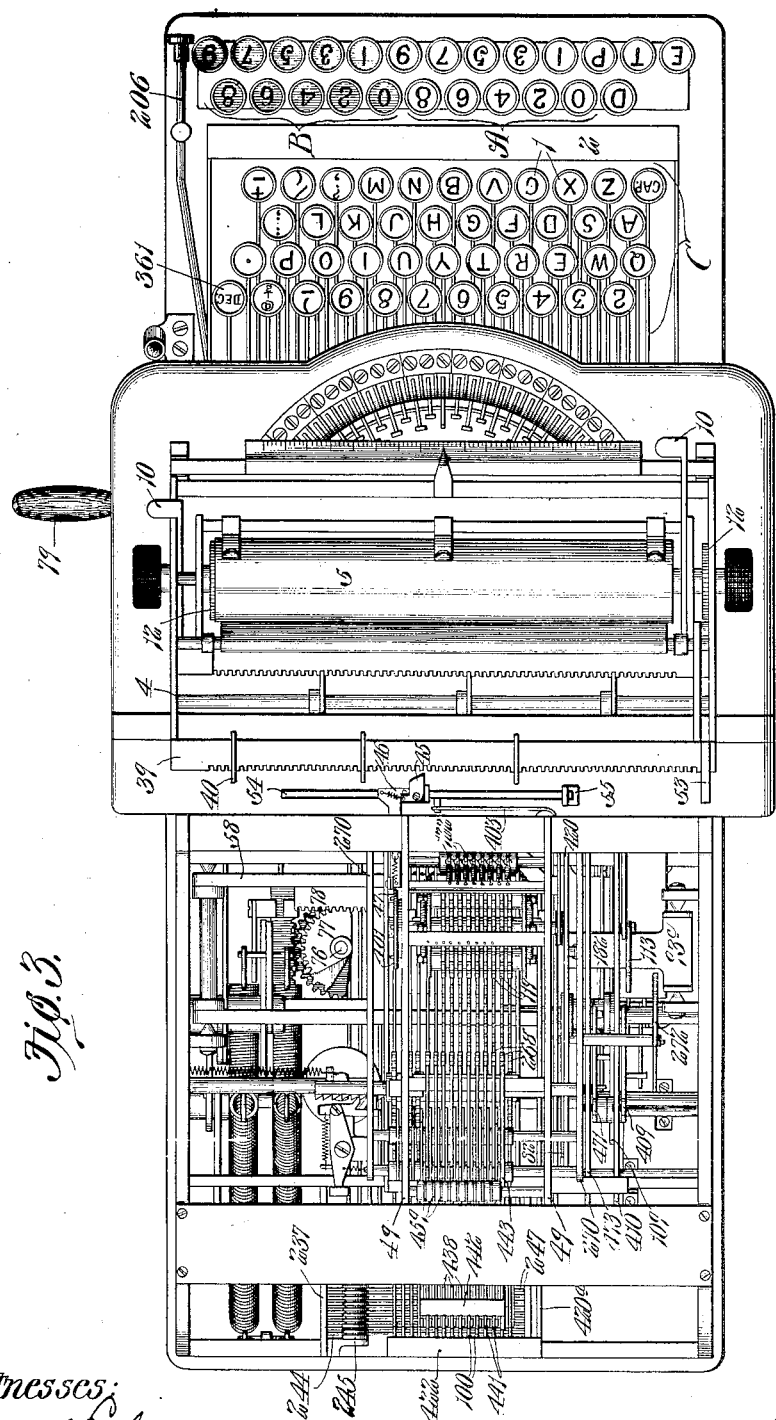

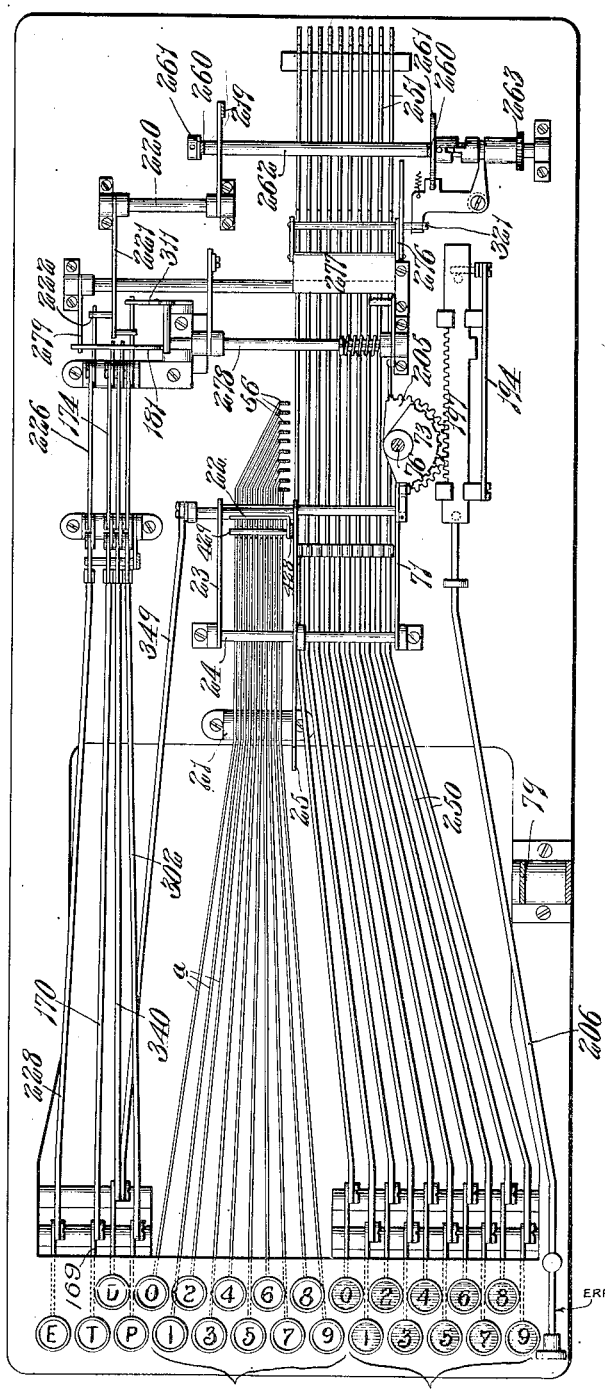

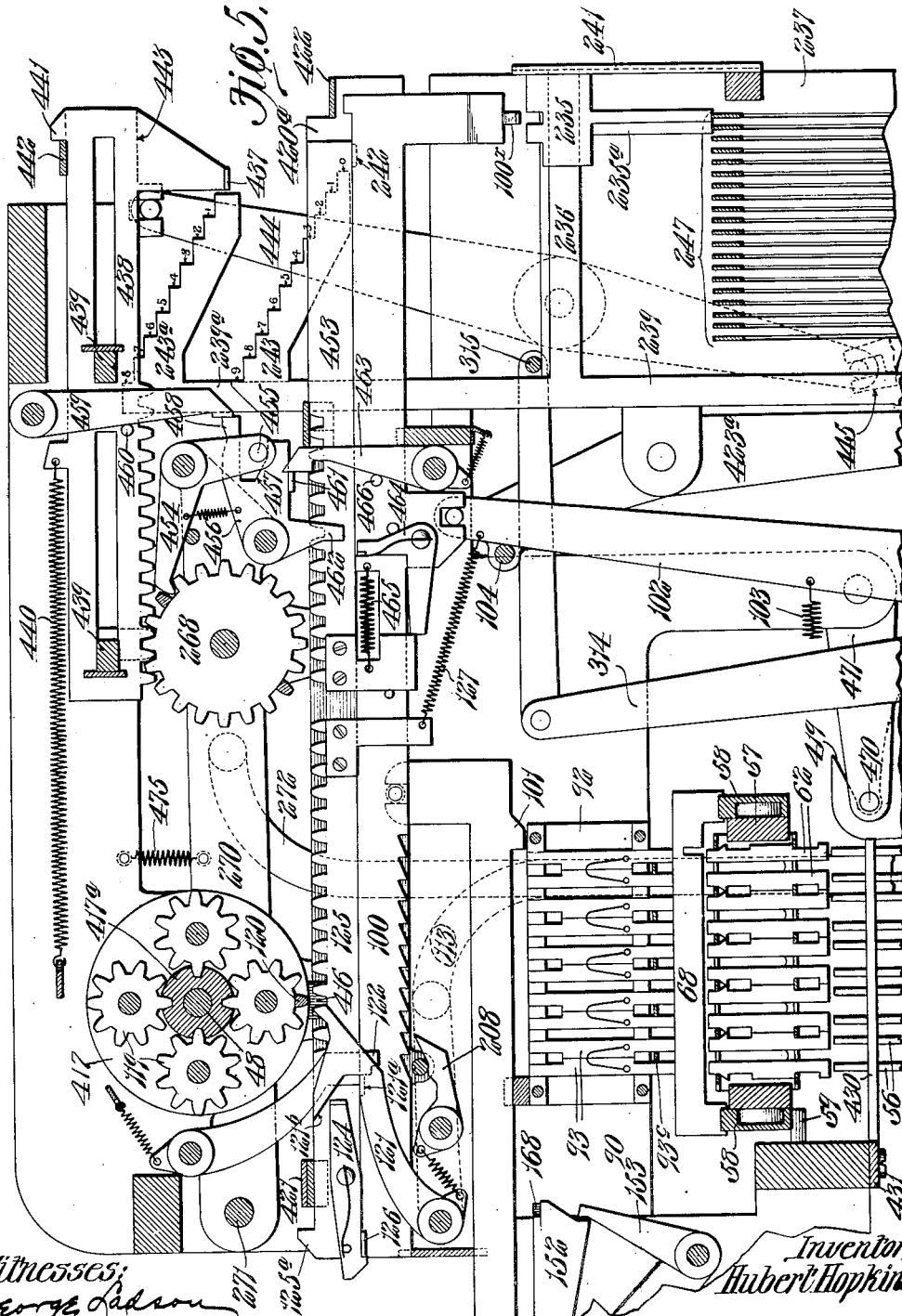

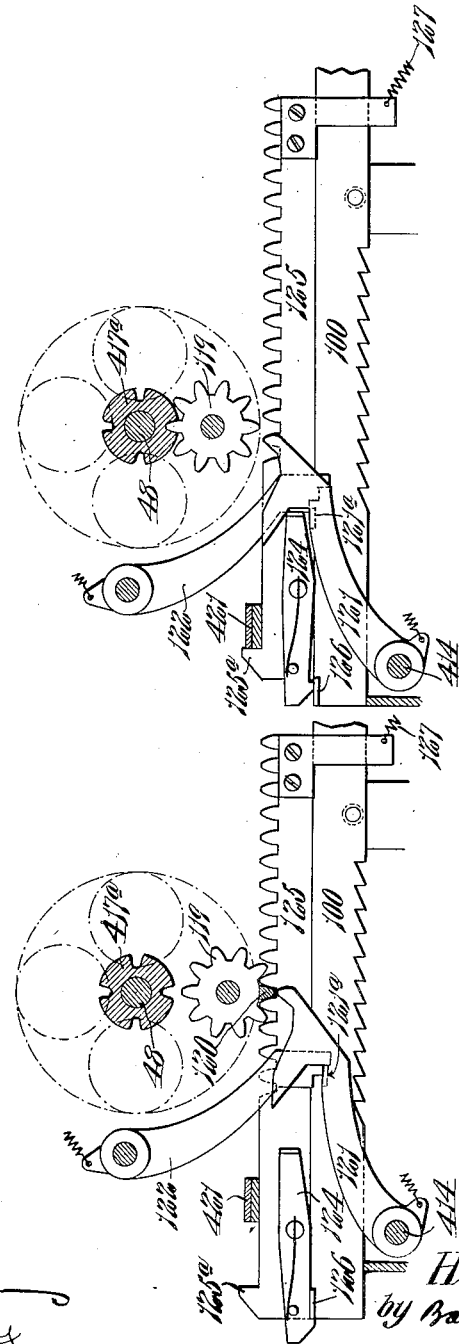

H. HOPKINS.
CALCULATING MACHINE.
APPLICATION FILED DEC. 12, 1908.

1,366,566.

Patented Jan. 25, 1921.
33 SHEETS—SHEET 7.

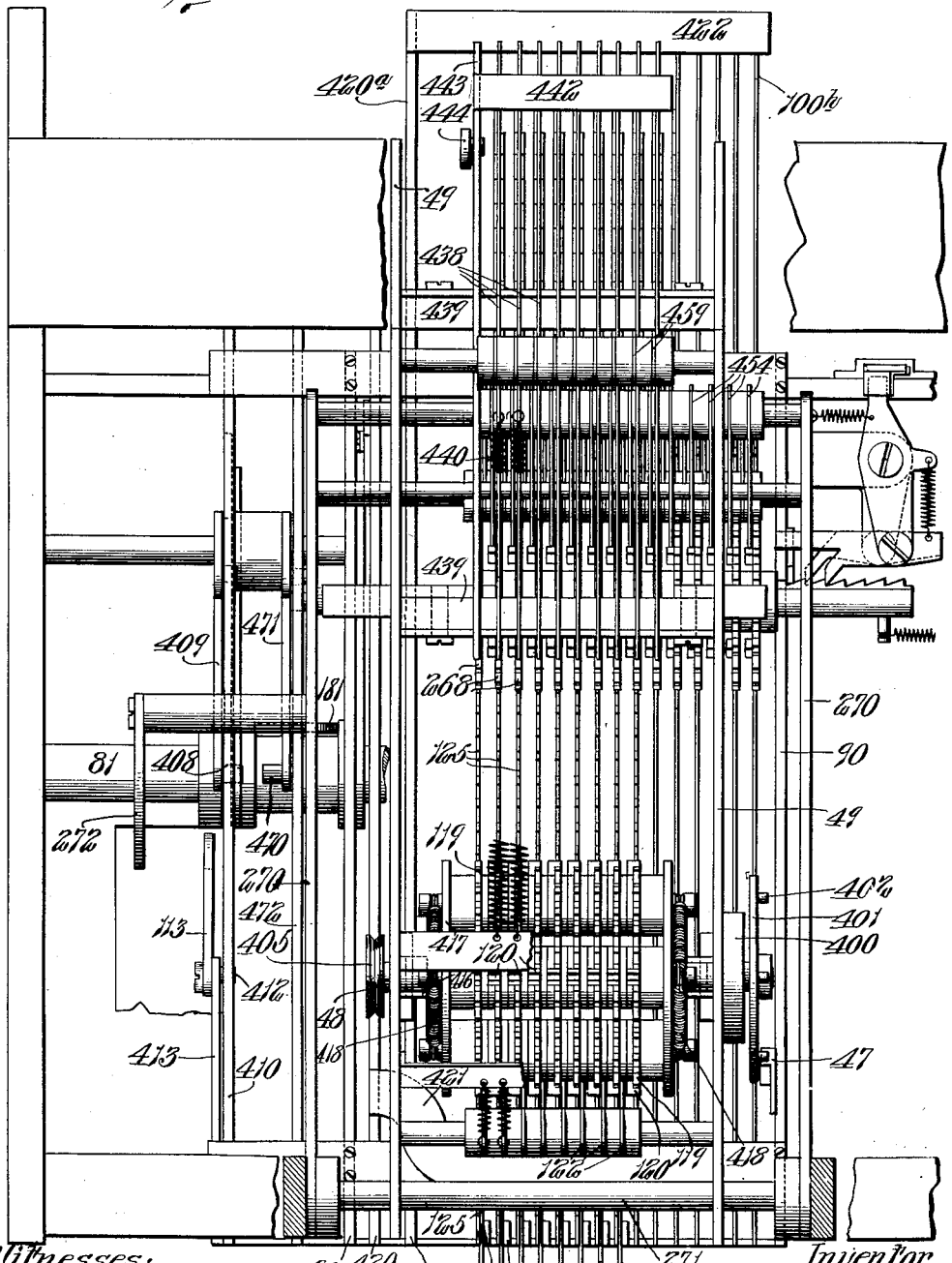

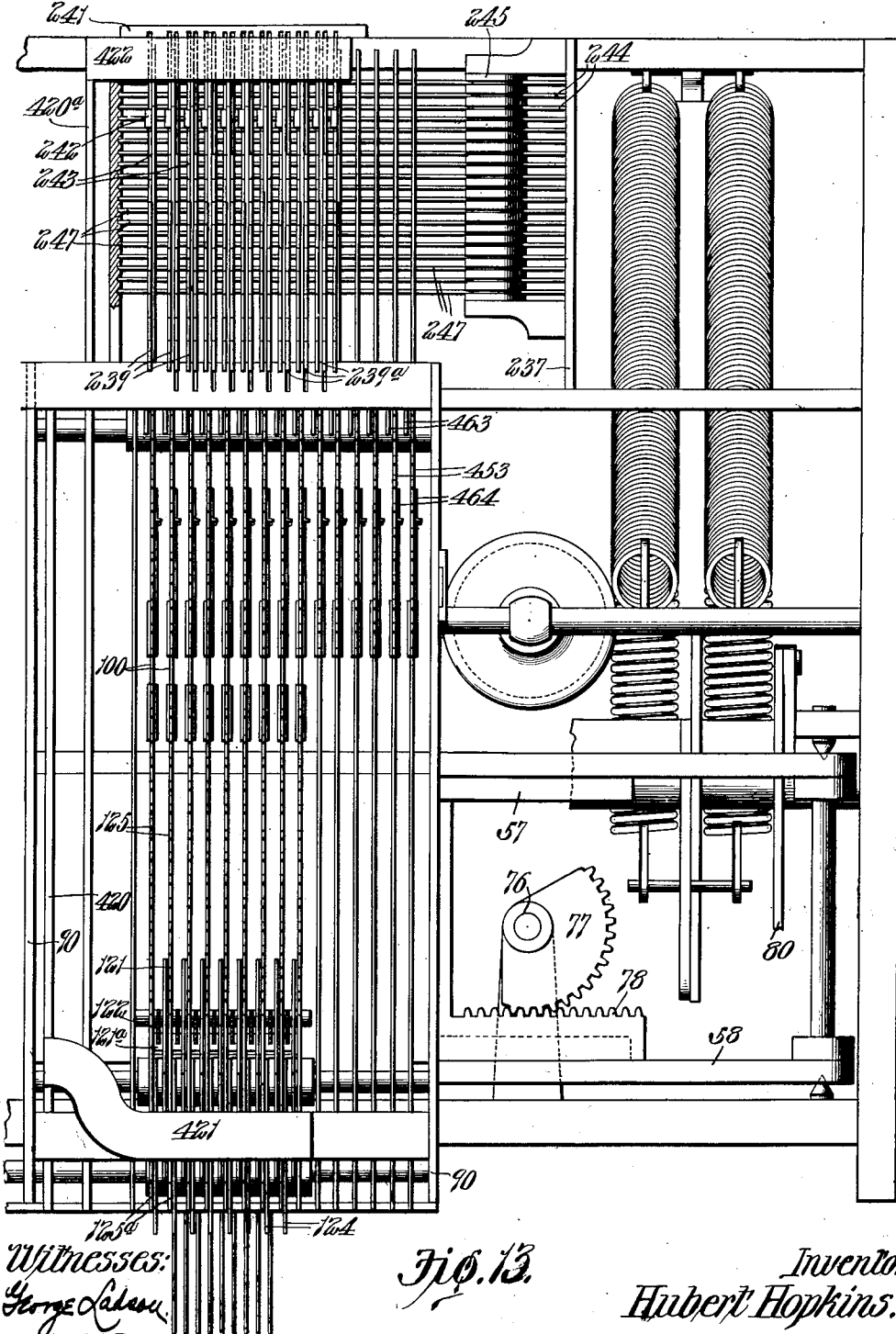

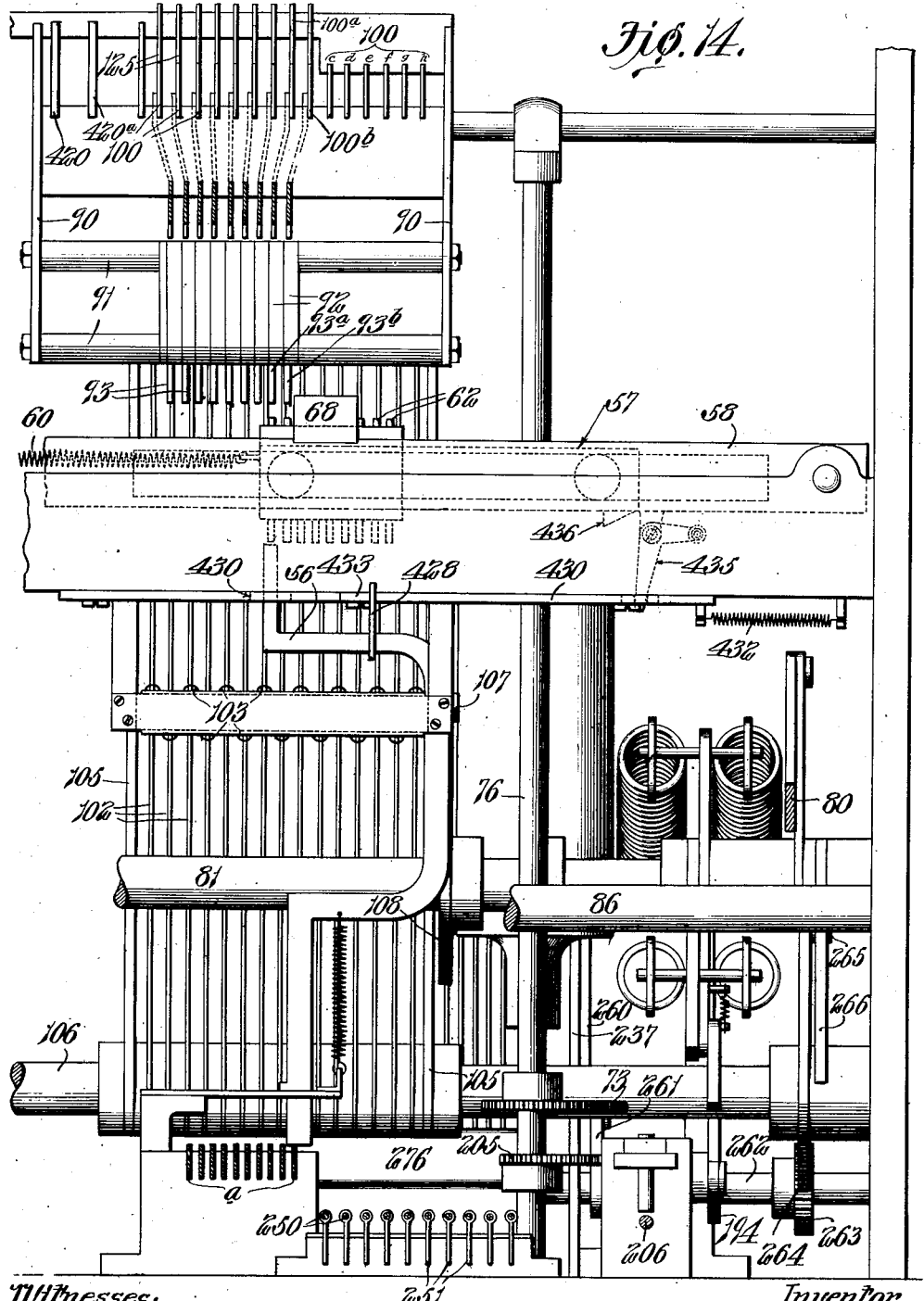

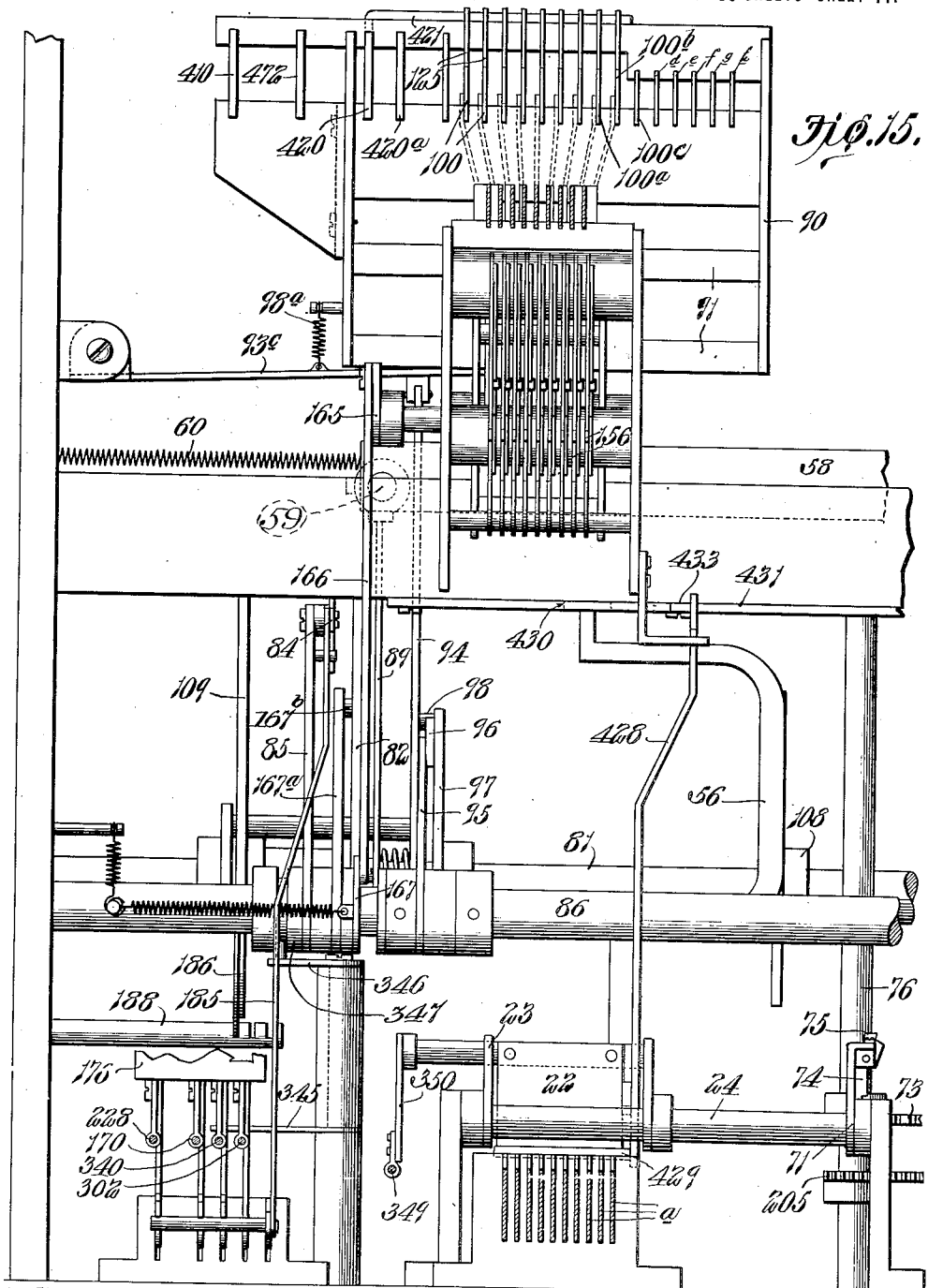

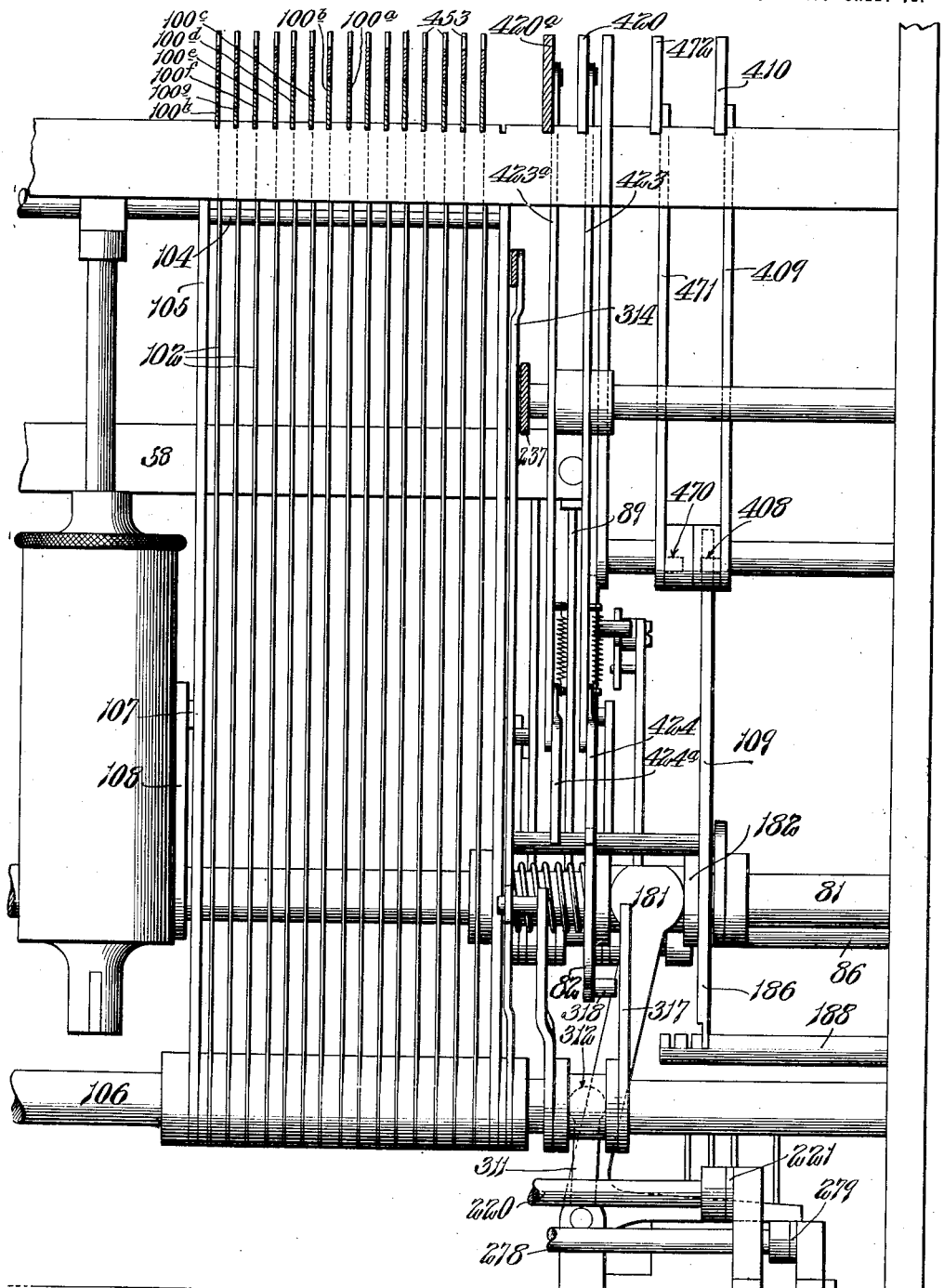

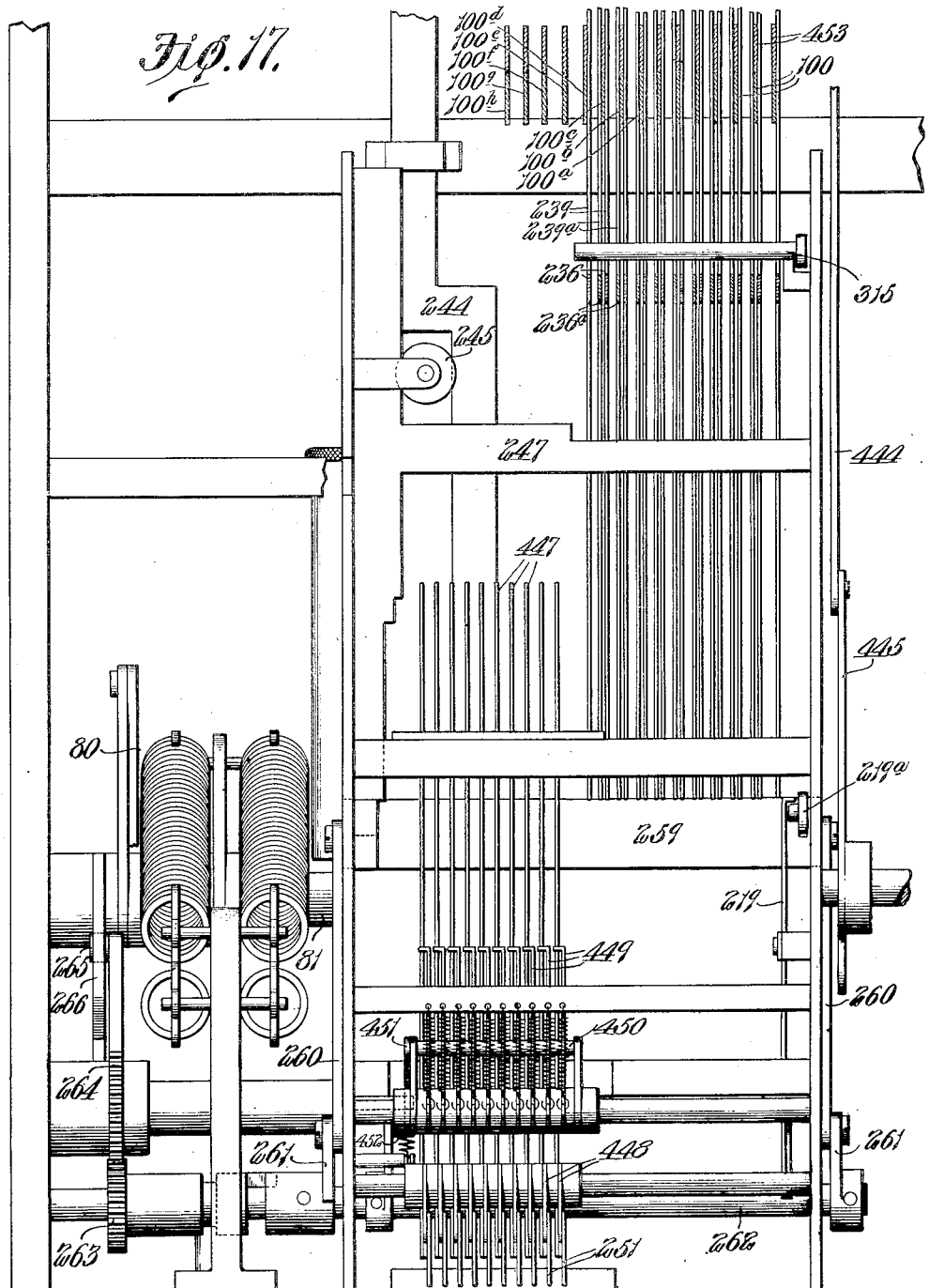

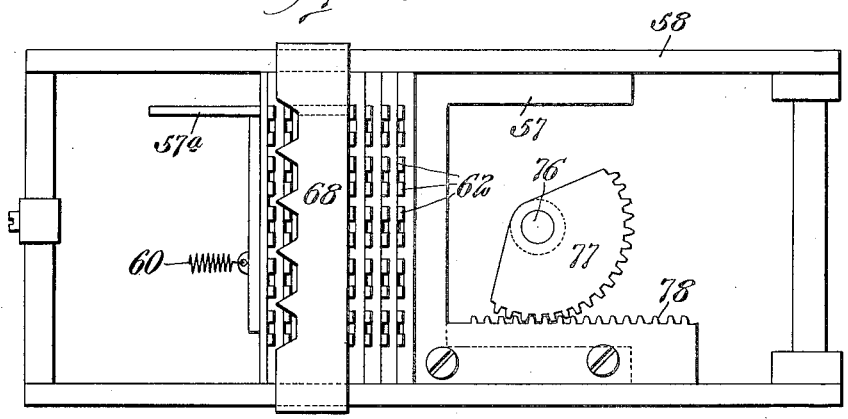
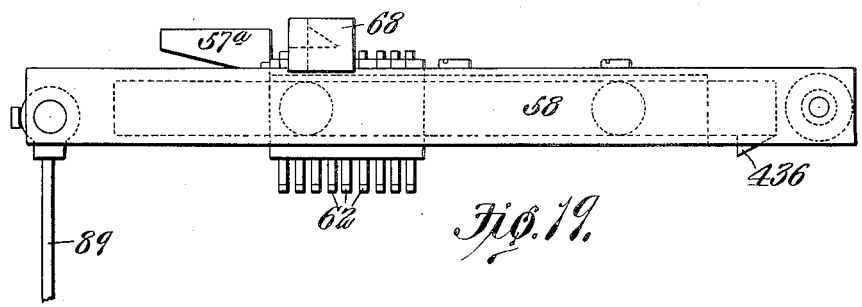
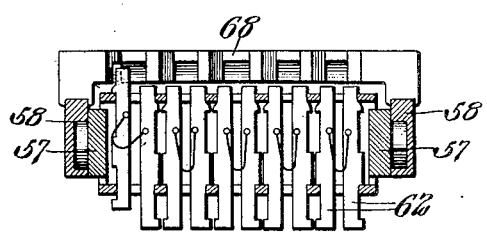
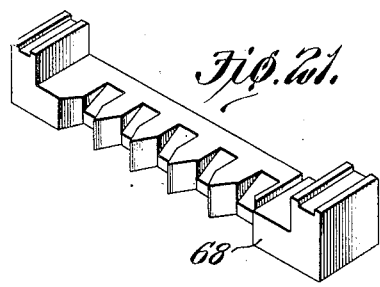

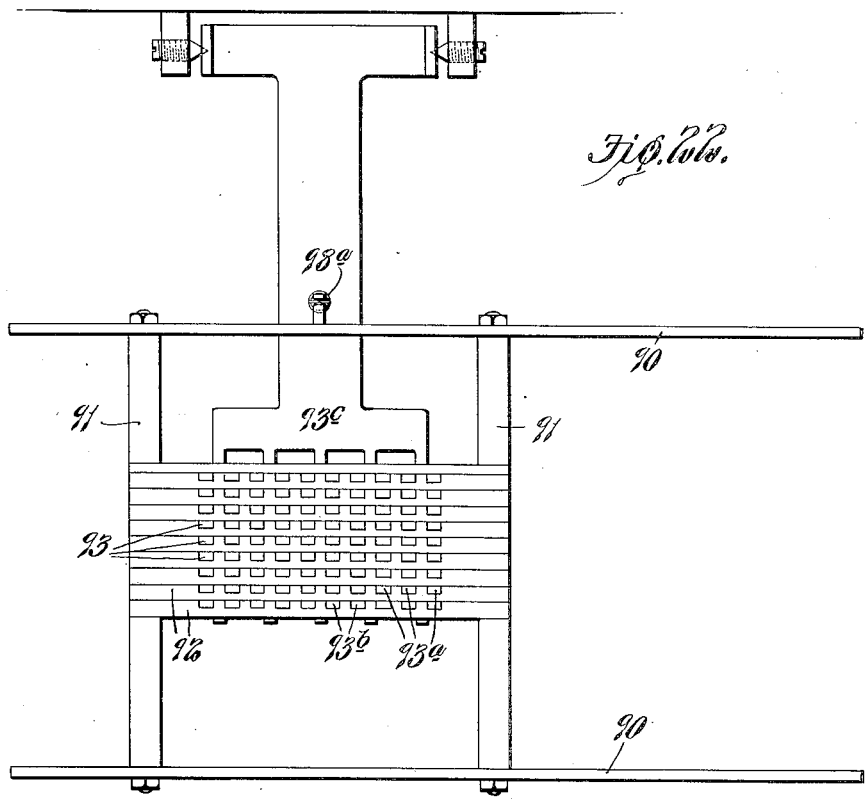
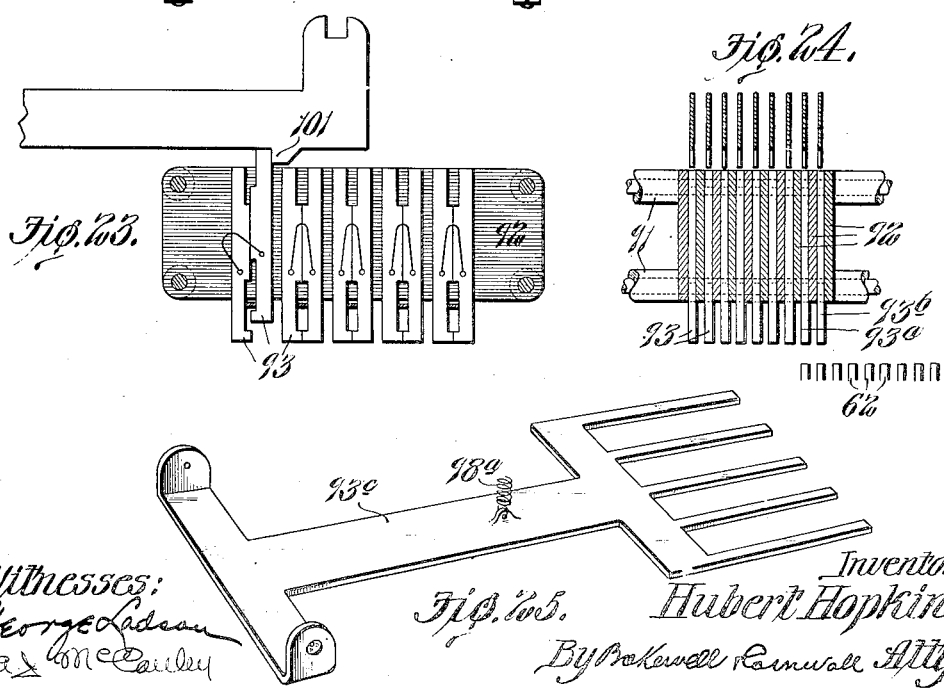

H. HOPKINS.
CALCULATING MACHINE.
APPLICATION FILED DEC. 12, 1908.
1,366,566.
Patented Jan. 25, 1921.
33 SHEETS—SHEET 16.
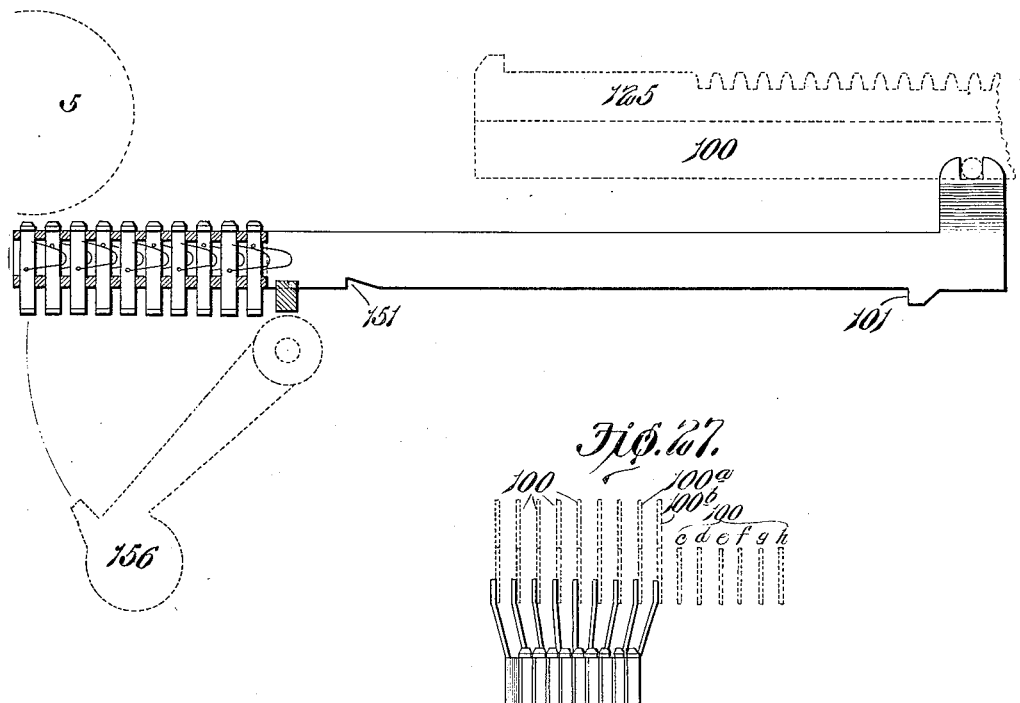
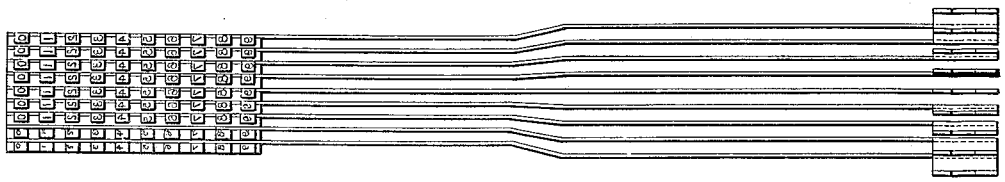
Witnesses:
George Ladrow.
A. J. McCauley
Inventor;
Hubert Hopkins.
By Bakewell Cornwall Attys.

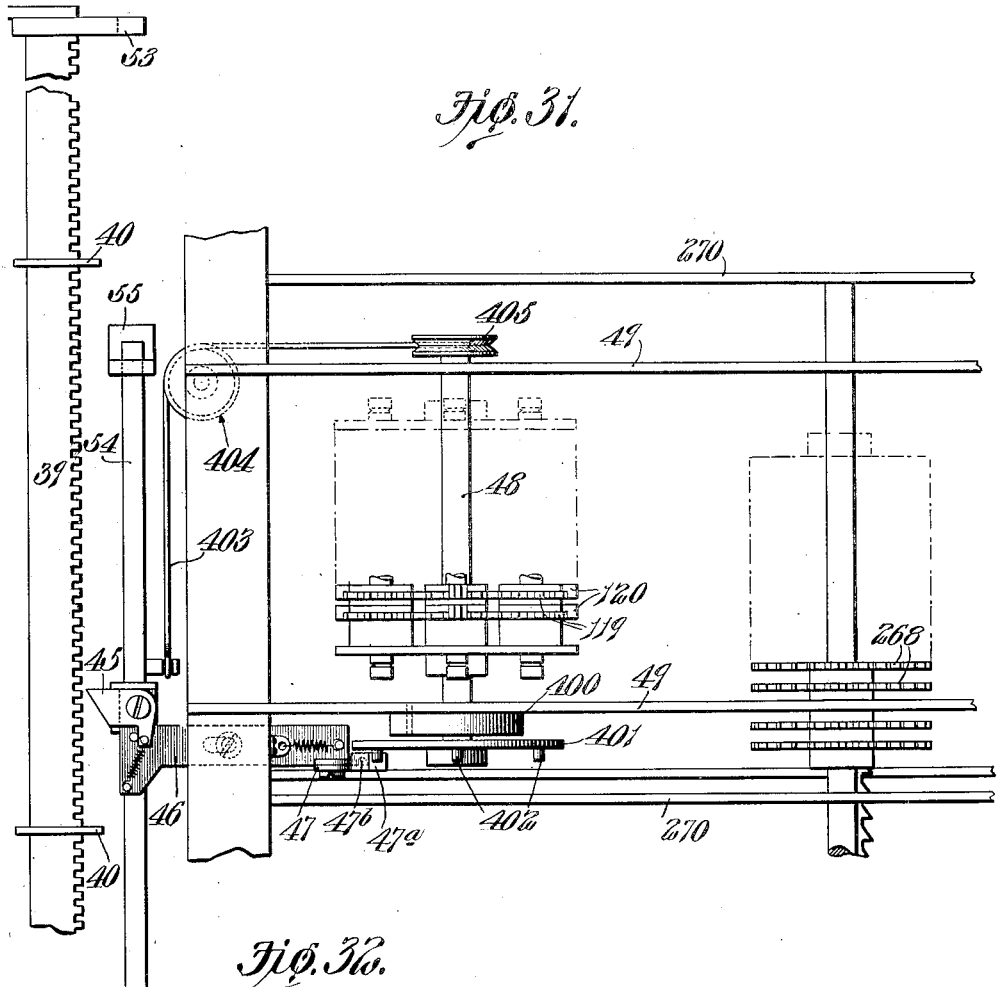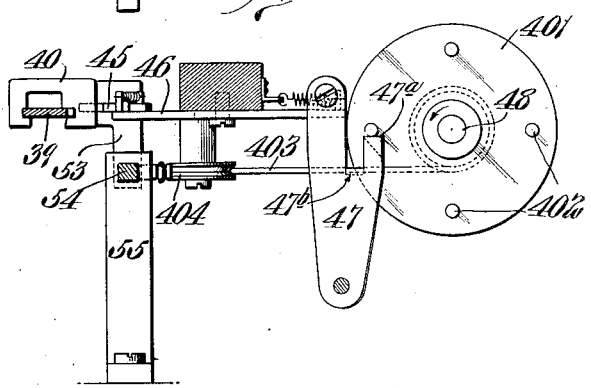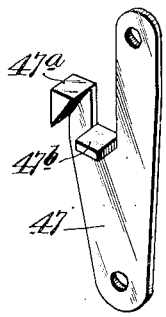

H. HOPKINS.
CALCULATING MACHINE.
APPLICATION FILED DEC. 12, 1908.

1,366,566.

Patented Jan. 25, 1921.
33 SHEETS—SHEET 19.

Witnesses:
George Radson
A J McCauley

Inventor:
Hubert Hopkins,
By Bakewell Cornwall, Attys.

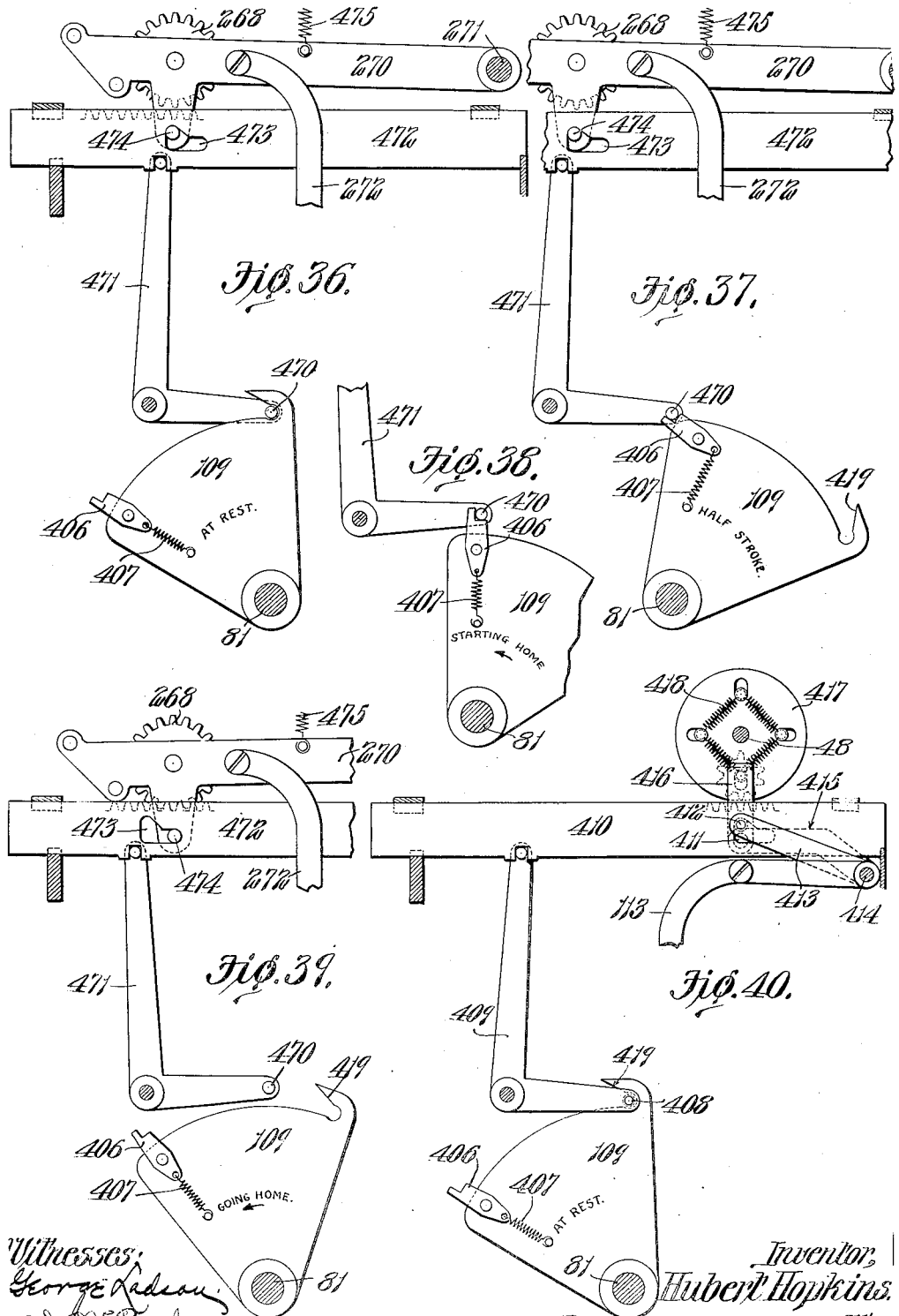

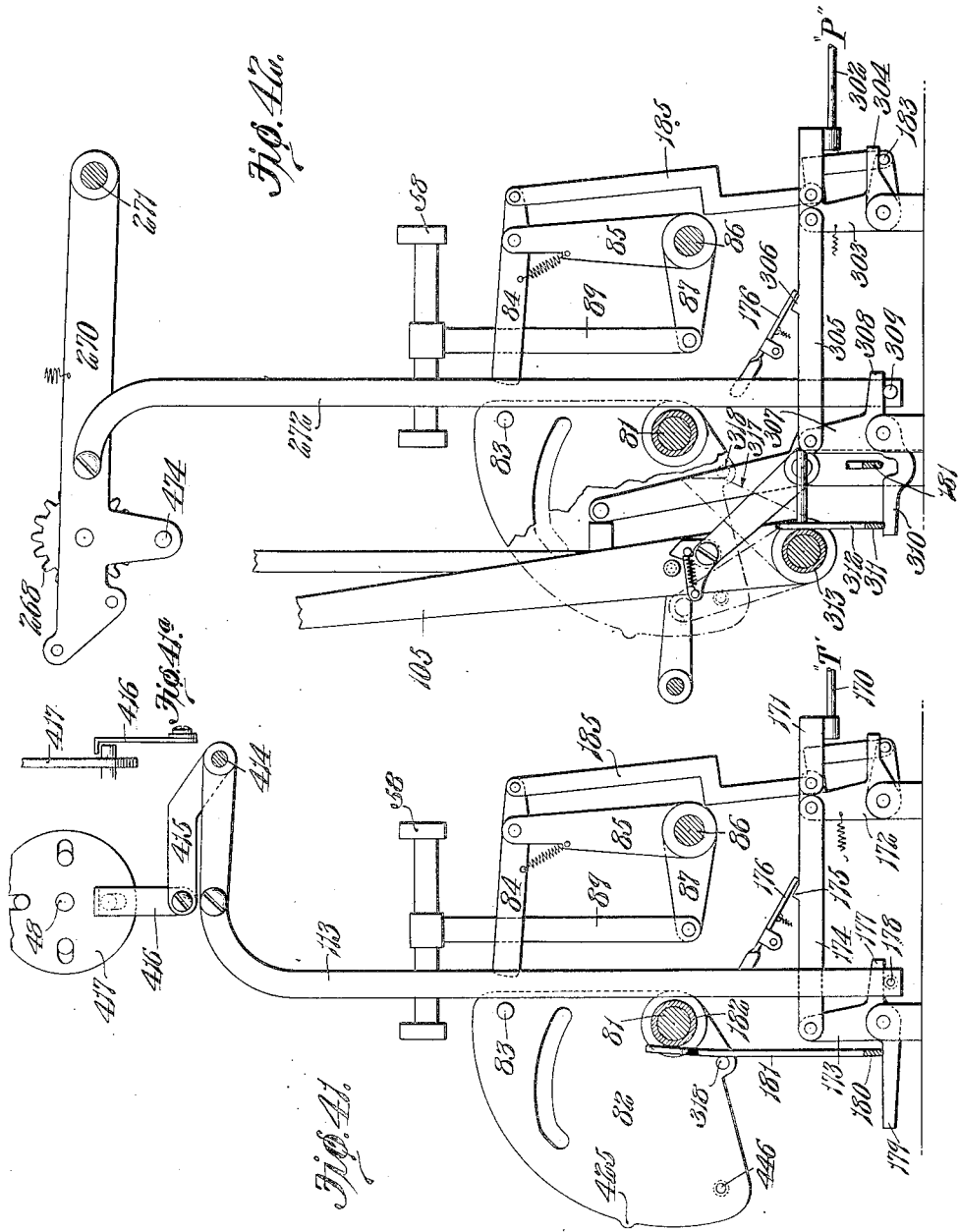

H. HOPKINS.
CALCULATING MACHINE.
APPLICATION FILED DEC. 12, 1908.

1,366,566.

Patented Jan. 25, 1921.
33 SHEETS—SHEET 22.

Witnesses:
George Kadson
Ad. McCauley

Inventor:
Hubert Hopkins.
By Bakewell Kamdall Attys

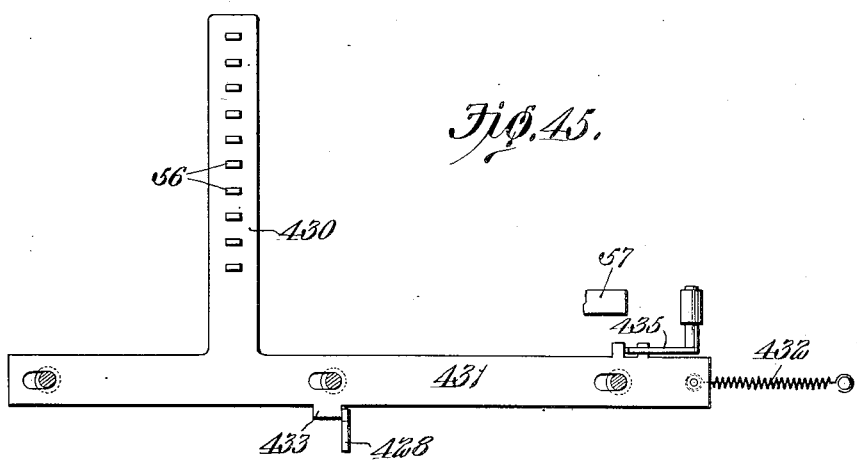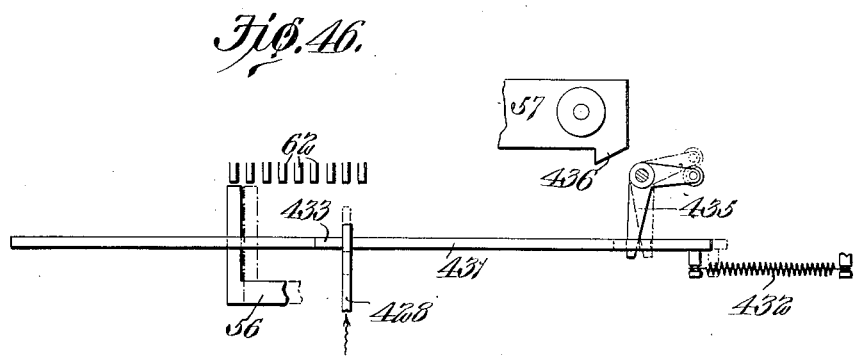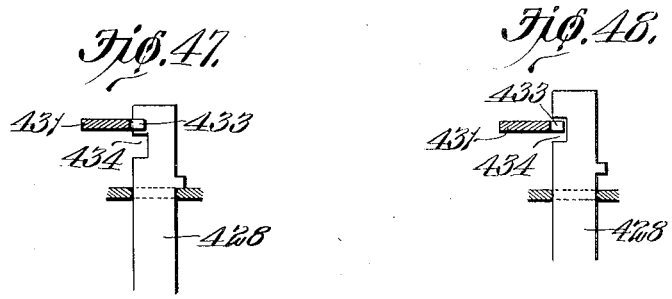

H. HOPKINS.
CALCULATING MACHINE.
APPLICATION FILED DEC. 12, 1908.
1,366,566.
Patented Jan. 25, 1921.
33 SHEETS—SHEET 24.
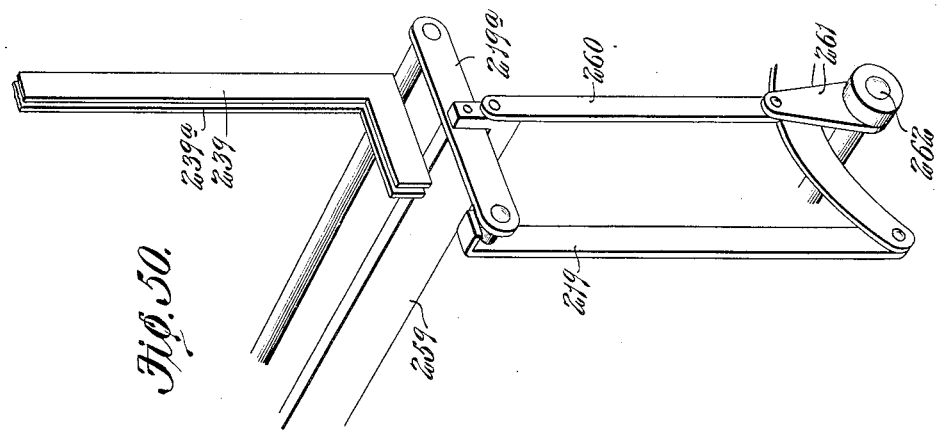
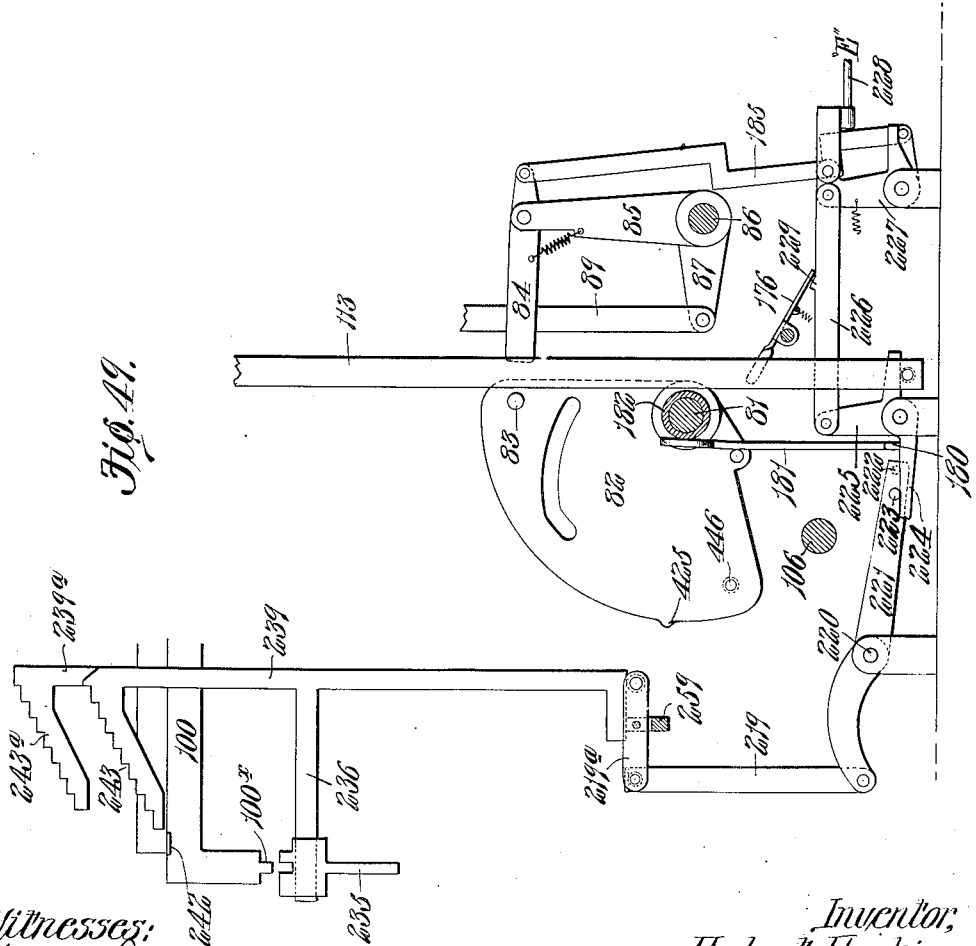
Witnesses:
George Padson
A. M. Cauley
Inventor,
Hubert Hopkins.
By Bakewell Cornwall Attys.

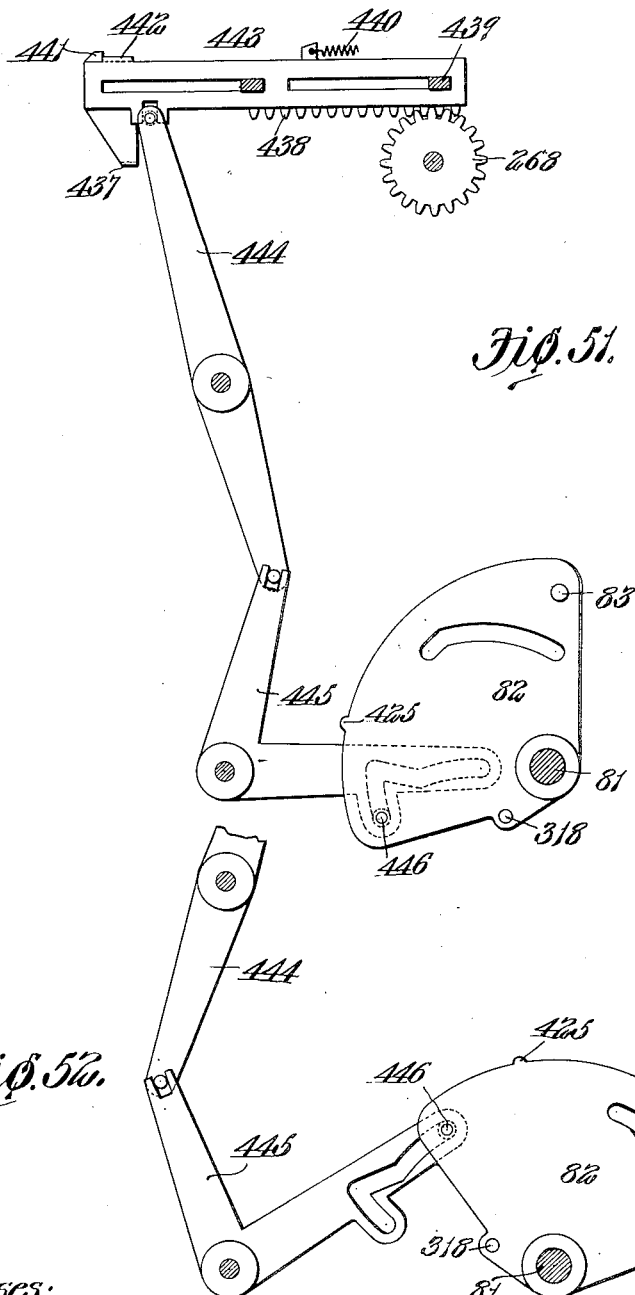

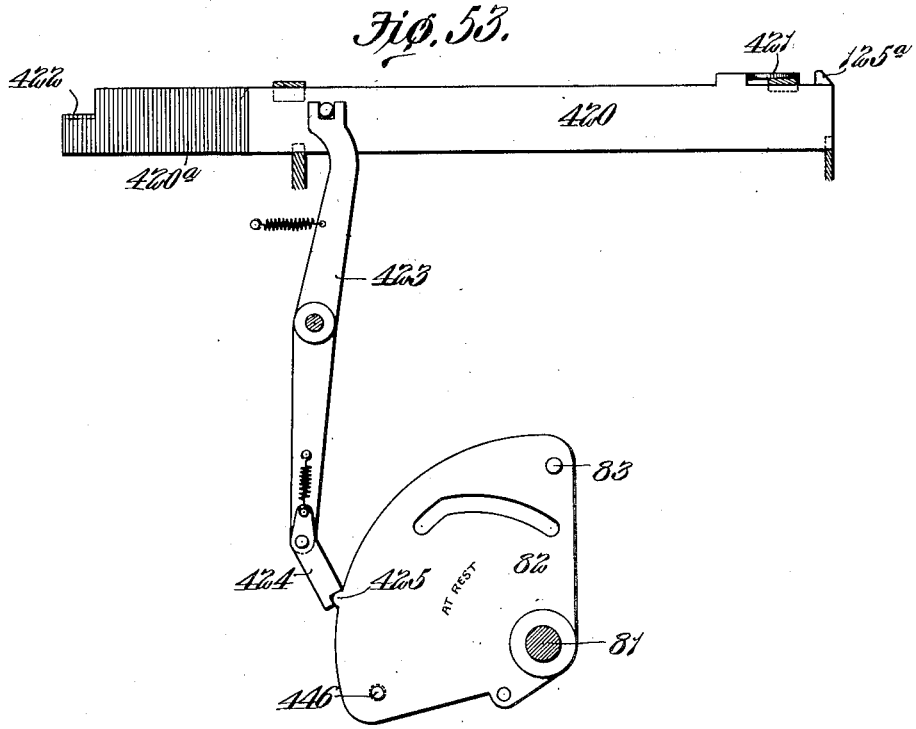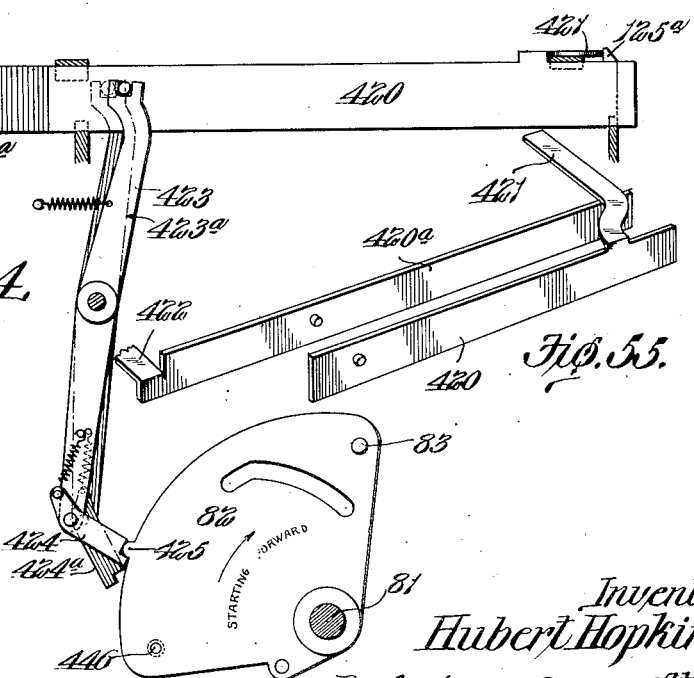

H. HOPKINS.
CALCULATING MACHINE.
APPLICATION FILED DEC. 12, 1908.
1,366,566.
Patented Jan. 25, 1921.
33 SHEETS—SHEET 27.
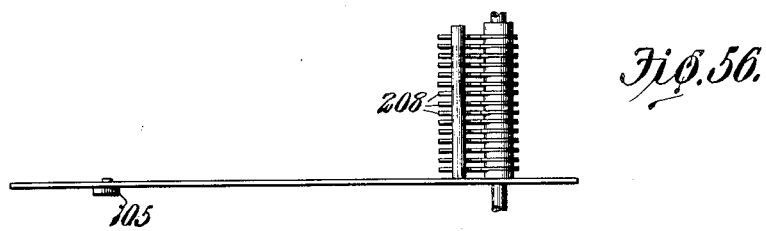
Fig. 56.
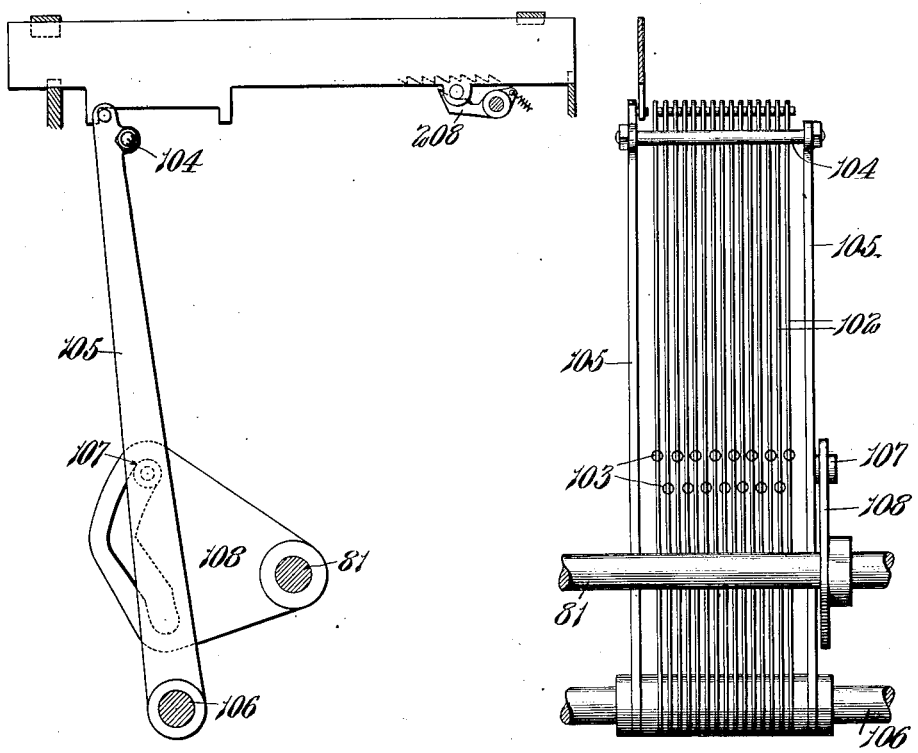
Fig. 57.
Fig. 58.
Witnesses:
Inventor,
Hubert Hopkins.
By Bakewell Cornwall Attys

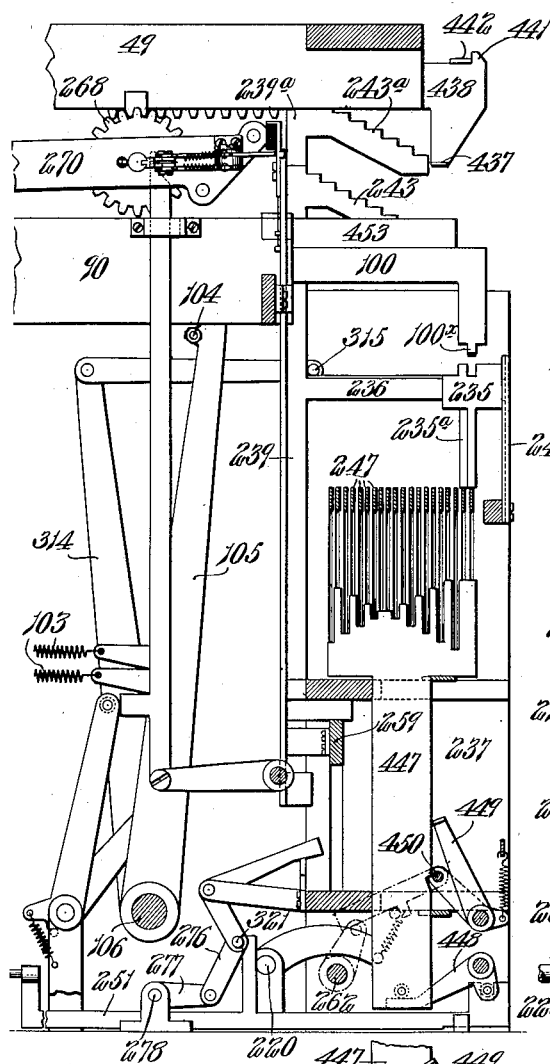
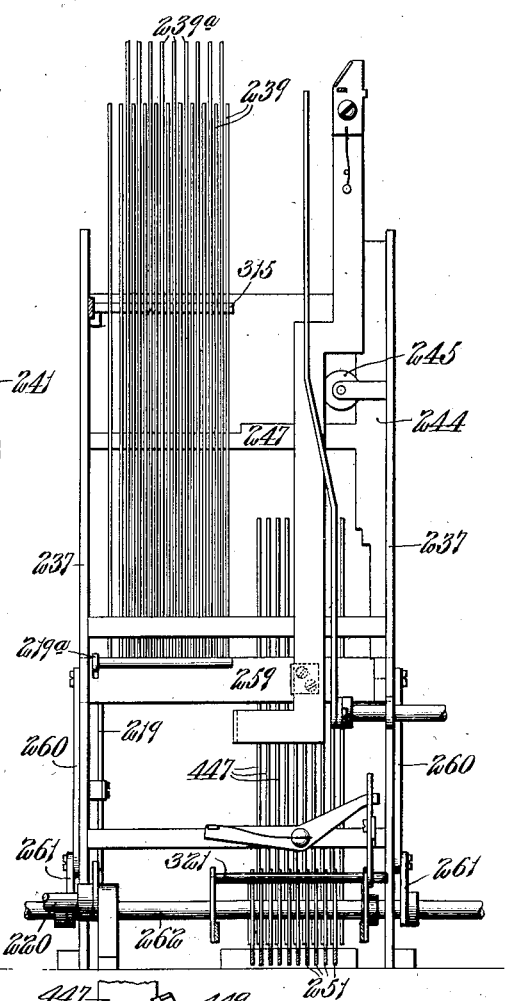
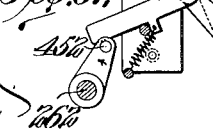

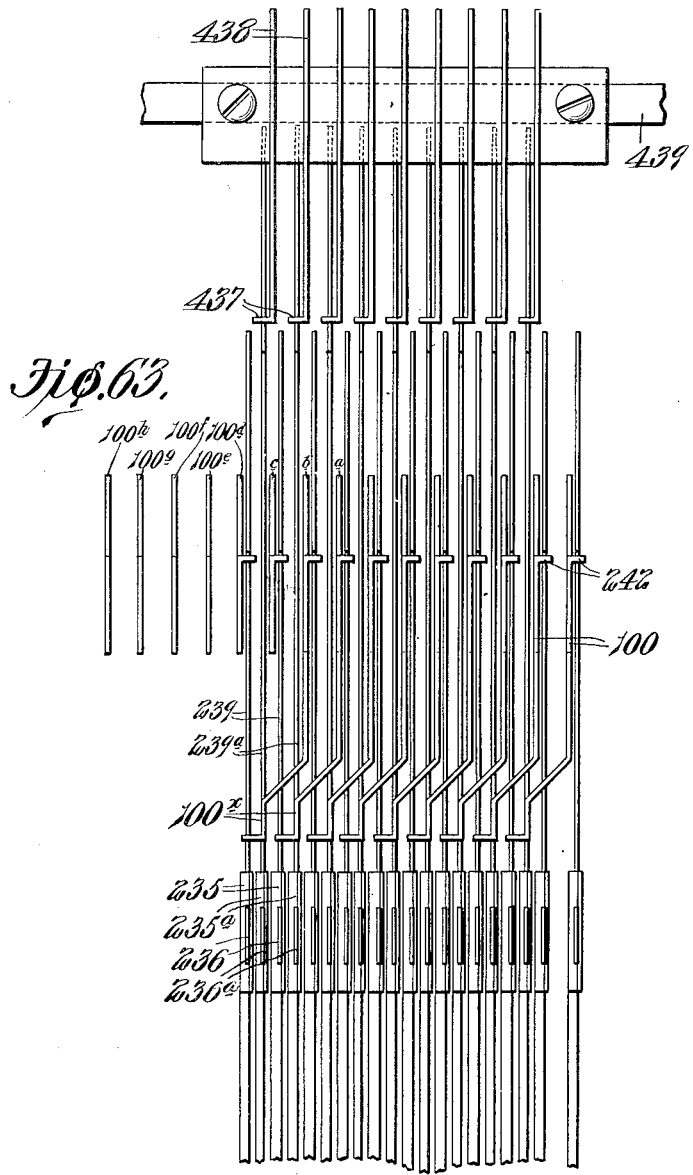

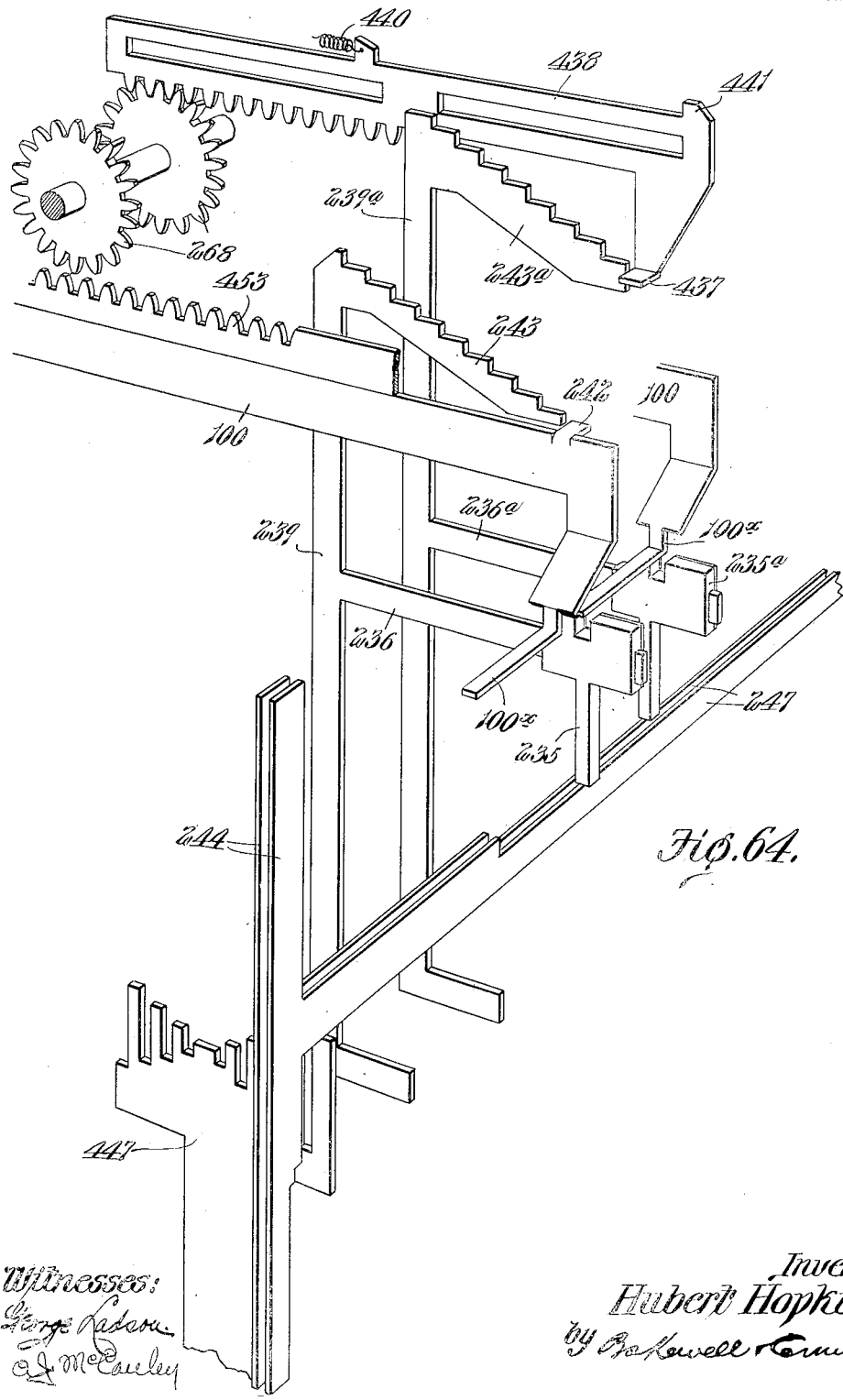

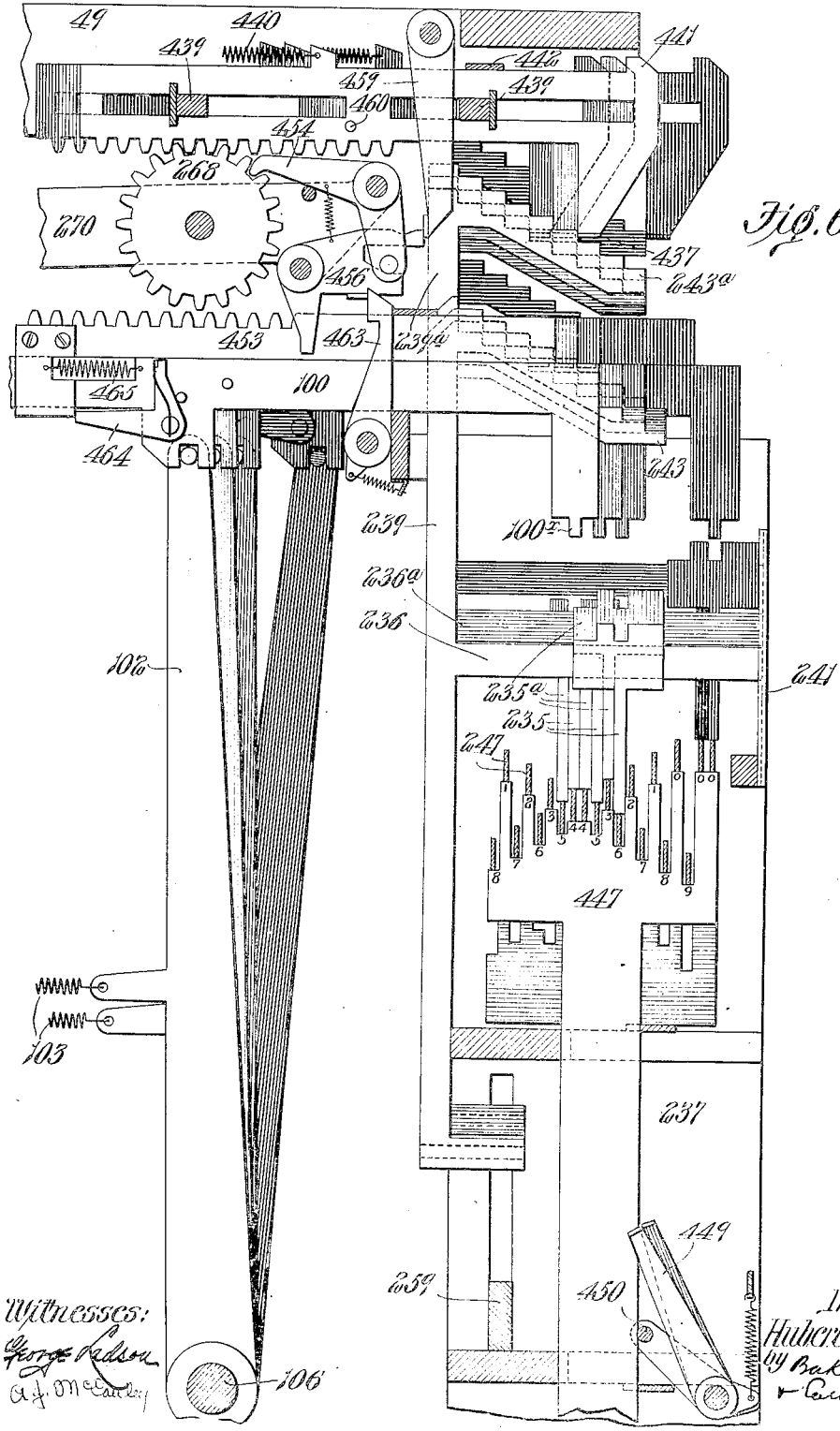

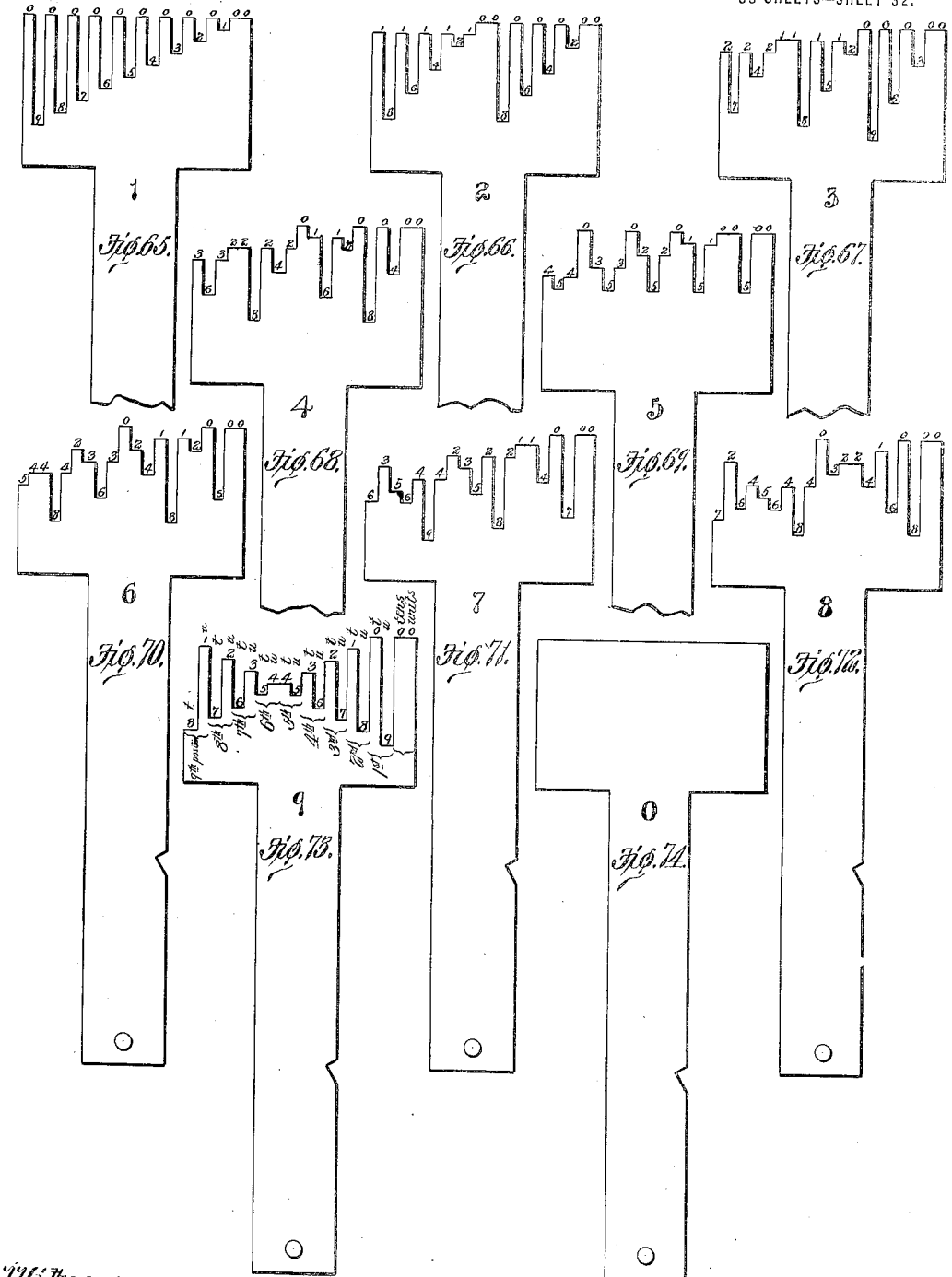

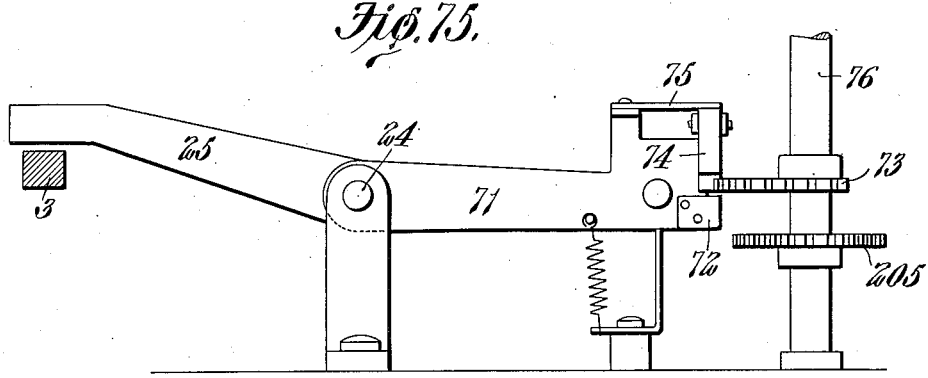
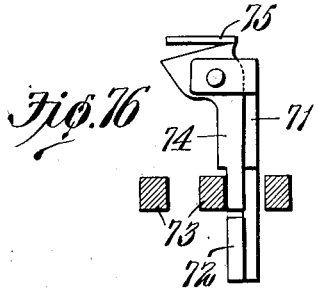
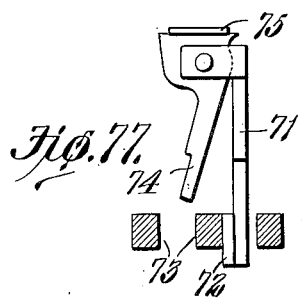
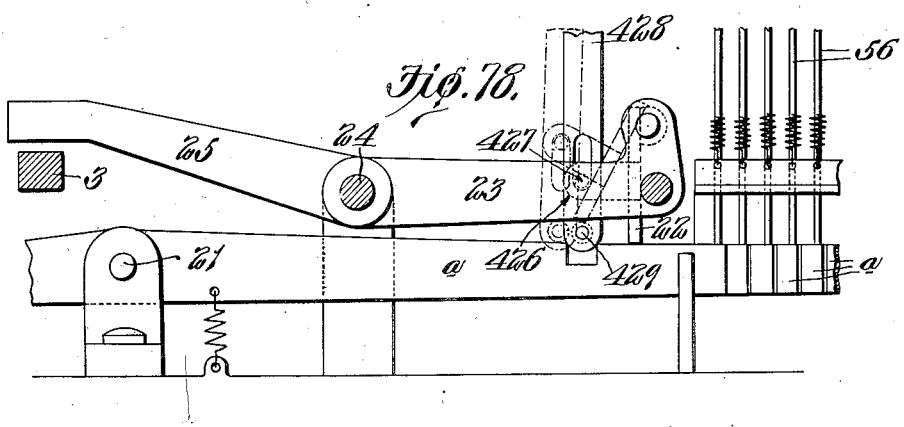

UNITED STATES PATENT OFFICE.

HUBERT HOPKINS, OF ST. LOUIS, MISSOURI, ASSIGNOR TO MOON-HOPKINS BILLING MACHINE COMPANY, OF ST. LOUIS, MISSOURI, A CORPORATION OF MISSOURI.

CALCULATING-MACHINE.

1,366,566.  Specification of Letters Patent.  Patented Jan. 25, 1921.

Application filed December 12, 1908. Serial No. 467,250.

*To all whom it may concern:*

Be it known that I, HUBERT HOPKINS, a citizen of the United States, residing at St. Louis, Missouri, have invented a certain new and useful Improvement in Calculating-Machines, of which the following is a full, clear, and exact description, such as will enable others skilled in the art to which it appertains to make and use the same, reference being had to the accompanying drawings, forming part of this specification, in which—

Fig. 2 is a similar view as seen from the right-hand side of the machine;

Fig. 3 is a top plan view;

Fig. 4 is a horizontal sectional view taken just above the key bars and showing the key-bar arrangement in plan;

Fig. 5 is a longitudinal vertical sectional view taken through the upper rear portion of the machine and showing the front and rear totalizers and their associate parts;

Fig. 6 is a detail view illustrating the carrying mechanism for the front totalizers, the parts being in the position they occupy when tripped by the tripping projections;

Fig. 7 is a similar view showing the parts in the position they occupy just before reaching their home position;

Fig. 8 is a view illustrating the carrying mechanism for the product totalizer, showing the parts in the position they occupy when tripped by the rack identified with the tens partial product;

Fig. 9 is a similar view showing the parts in the position they occupy just before the tens partial product rack is restored to its home position;

Fig. 10 is a similar view showing the position of the parts in the carrying mechanism of the product totalizer when tripped in connection with the actuation of said totalizer wheels by the units partial product rack;

Fig. 11 is a similar view illustrating the position of the parts just before the units partial product racks are restored to their home position;

Fig. 12 is a full-size top plan view of the registers and their associate parts at the left-hand side of the machine;

Fig. 13 is a top plan view of the actuating racks for the registers or totalizers, and showing the associate parts at the right-hand side of the machine;

Fig. 14 is a front elevational view of the parts shown in Fig. 13;

Fig. 15 is a front elevational view of some of the parts shown in Fig. 13, and also illustrating the mechanism at the left-hand side of the machine;

Fig. 16 is a rear elevational view of the rack-driving levers and their associate parts, said view looking toward the front of the machine;

Fig. 17 is a rear elevational view of the parts shown at the right-hand side of the machine including the multiplying mechanism;

Fig. 18 is a top plan view of the traveling carriage and its setting up pins;

Fig. 19 is a side elevational view of said traveling carriage;

Fig. 20 is a vertical cross sectional view through the carriage;

Fig. 21 is a detail view of the restoring bar for the setting up pins in said traveling carriage;

Fig. 22 is a top plan view of the stop pins which coöperate with the register-actuators;

Fig. 23 is a detail view showing a longitudinal series of said stop pins, one of the pins being shown in elevated operative position;

Fig. 24 is a cross sectional view showing the relation of said stop pins to the register-actuators, and to the setting up pins of the traveling carriage;

Fig. 25 is a detail view of the registering device for said stop pins;

Fig. 26 is a side elevational view showing the relation of the type carriers to the platen, the type hammers, and the register-actuators;

Fig. 27 is a front elevational view of the type carriers;

Fig. 28 is a top plan view of the type carriers;

Fig. 31 is a top plan view of the controlling mechanism for the front totalizers;

Fig. 32 is a side elevational view of the same;

Fig. 33 is a detail view of the escapement pawl used in connection with said controlling mechanism;

Fig. 34 is a side elevational view illustrating the power shaft and parts directly operated thereby;

Figure 54:
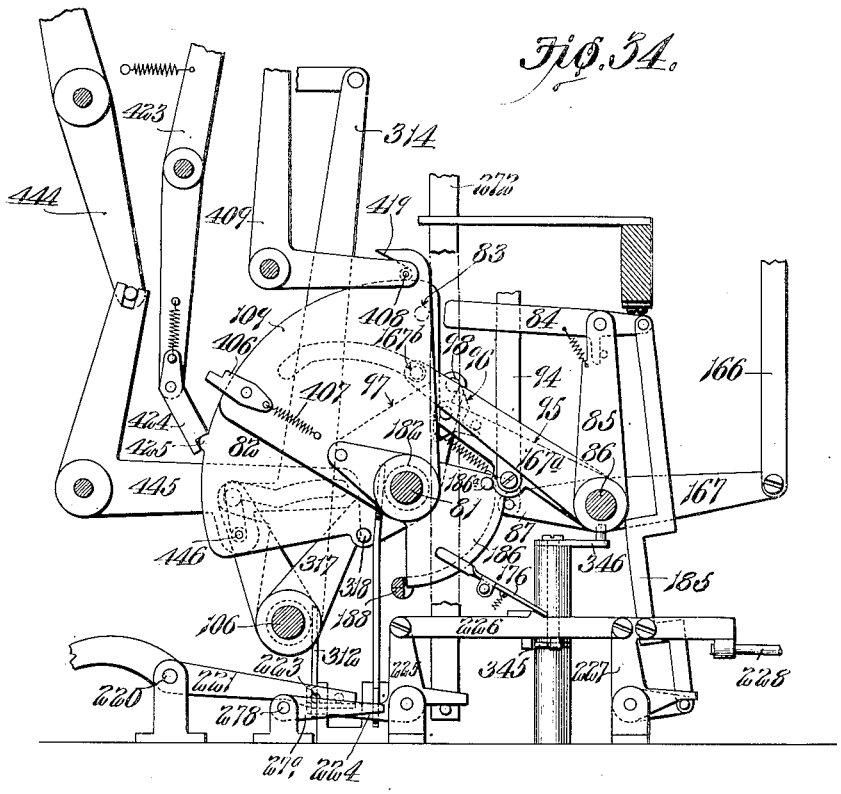
Figure 35:
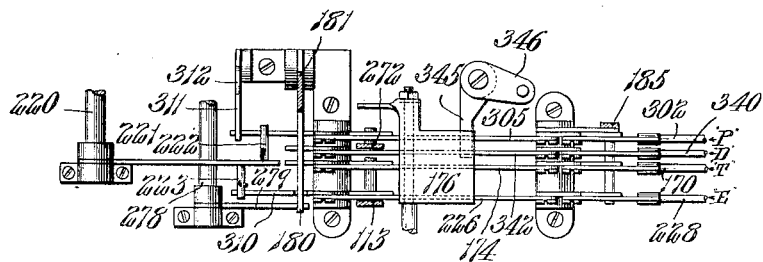
Fig. 35 is a top plan view of the result key connections.
Figure 44:
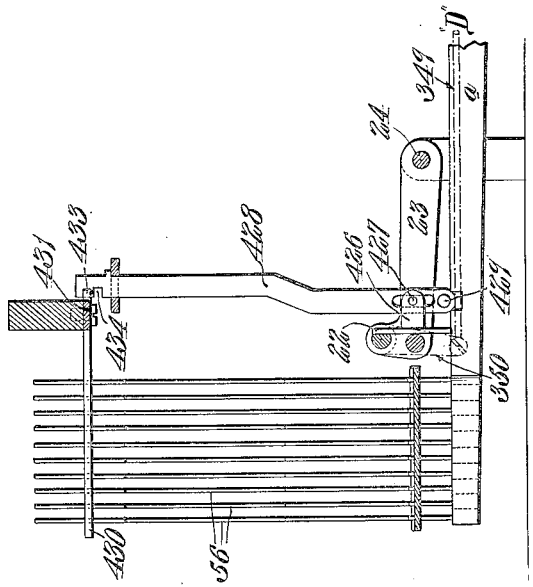
Figure 45:
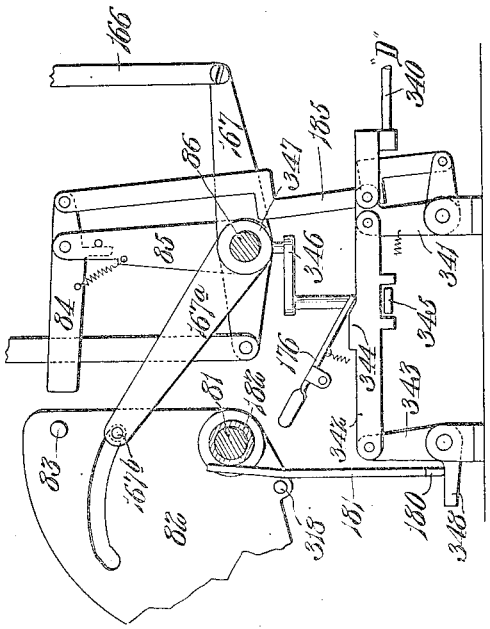

Figs. 36 to 40 inclusive are diagrammatic views illustrating means for engaging and disengaging the front and rear totalizers with their actuating devices in the ordinary operations of the machine;

Fig. 41 is a diagrammatic view in side elevation of the "T" or total key and its connections;

Fig. 41ª is a detail view;

Fig. 42 is a similar view of the "P" or product key and its connections;

Fig. 43 is a similar view of the "D" or decimal key and certain of its connections;

Fig. 44 is a similar view of the said "D" or decimal key and other of its connections;

Fig. 45 is a plan view of certain of the parts shown in Fig. 44;

Fig. 46 is a front elevational view of the parts shown in Fig. 45;

Figs. 47 and 48 are detail views of the controlling bar illustrated in Figs. 44 to 46;

Fig. 49 is a similar view of the "E" or extension key and certain of its connections;

Fig. 50 is a detail view of certain other connections of the said "E" or extension key;

Fig. 51 is a similar view of the means for restoring the tens partial product racks;

Fig. 52 is a view of certain of said parts in different positions;

Fig. 53 is a similar view illustrating the means for restoring the displaced racks employed with the carrying mechanism and identified with the front and rear totalizers, and which are operated in the ordinary operations of the machine;

Fig. 54 is a similar view of the same parts in changed positions;

Fig. 55 is a detail view of the restoring bars;

Fig. 56 is a plan view of the restraining pawls which prevent unnecessary idle movement of the register-actuator devices, as in total-taking operations;

Fig. 57 is a diagrammatic view, in side elevation, illustrating said restraining pawls and their operating mechanism;

Fig. 58 is a front elevational view of the parts shown in Fig. 53;

Fig. 59 is a vertical sectional view through the multiplying mechanism;

Fig. 60 is a front elevational view of certain of the parts shown in Fig. 59;

Figs. 61 and 62 are detail views, in side elevation, of the means for holding a selected multiplier plate elevated, and for releasing said plate;

Fig. 63 is a rear elevational view (full-size) illustrating the means connected to the register-actuators for positioning the setting up devices, whereby the multiplicand is introduced into the multiplying mechanism;

Fig. 64 is a detail view illustrating diagrammatically the devices shown in Fig. 63;

Fig. 64ª is a side elevational view of multiplying parts;

Figs. 65 to 74 inclusive are views, in side elevation, of the multiplier plates identified with the "1," "2," "3," "4," "5," "6," "7," "8," "9," and "0" digit keys respectively;

Fig. 75 is a side elevational view of the escapement mechanism which controls the traveling carriage;

Figs. 76 and 77 are enlarged views illustrating the positions of the escapement pawl which controls the traveling carriage; and Fig. 78 is a side elevational view illustrating certain of the parts operated upon the depression of the "D" key.

This invention relates to new and useful improvements in calculating machines of that type illustrated in Belgian Patent No. 202,081, dated August 21, 1907, and also in my application for United States Letters Patent No. 310,739, filed April 9, 1906.

The machine illustrated in the present application is designed especially for use in computing currency by the decimal system, and with that end in view is provided with what may be designated as "dimes" and "cents" register-actuators which are, in reality, tenths and hundredths decimal actuators. The printing type which are positioned by these two decimal actuators preferably print smaller figures than do the type controlled by the actuators identified with whole numbers, such as dollars, tens of dollars, hundreds of dollars, etc. A decimal point is also placed in front of each printing character controlled by the tenths decimal slide bar.

The following are the special features of my present invention which differ in principle of operation or details of construction from the machine of my aforesaid patent and application:

1. To compute currency or things decimally, and print the decimals in smaller characters together with a decimal point.

2. The arrangement of the revoluble totalizers and the provision of novel carrying mechanism in connection therewith.

3. The novel construction and arrangement of parts which control the position of the forward totalizers from the typewriter carriage.

4. The new arrangement of the pawls for preventing idle movement of the slide bars in total-taking operations.

5. The novel means of engaging and disengaging the front and rear totalizers from their actuators.

6. The provision of register-actuators with means for directly positioning the setting up devices, whereby the multiplicand is placed in the multiplying devices.

7. In the provision of automatic means for restoring the product register to normal position before clearing the same of its product.

8. In the novel means for introducing and adding together tens and units partial products in the product register, in one operation of the machine (equivalent to one stroke of the handle). In the machine of my aforesaid patent and application two handle operations are necessary to introduce tens and units partial products in the product register.

9. The mechanism controlled by the "D" or decimal key whereby when said key is depressed and a key struck in group A the tenths decimal slide bar will be brought into action is common to my aforesaid application. In the present machine, by holding said "D" key down and pressing a second key in group A, the hundredths decimal slide bar is automatically brought under control of the key board.

10. The novel construction of the multiplying mechanism whereby the two figures at the right of the number set up on the key board (of the lowest numerical order) will be automatically set up in the multiplying mechanism as decimals.

11. In the new principle of operation of a product register whereby the wheels thereof are, without interruption, successively actuated to introduce tens and units partial products.

12. In simultaneously obtaining the tens and units partial products of a multiplicand to be multiplied by a selected digit, and in deferring the introduction of one of said partial products into the product totalizer during the time that the other of said partial products is being introduced therein.

13. In providing a carrying mechanism common to two actuating racks capable of operation by two independently operable actuators for said totalizer.

Other features of my invention consist in the construction and novel arrangement of parts which will hereinafter be described and afterward pointed out in the claims.

In the following description I shall use the same reference characters below 400 to refer to corresponding parts which are shown in my aforesaid patent and application. Reference character 400 and above refer to the parts indentified with the new features disclosed in this present application, but not found in my aforesaid patent and application.

*The key board.*

The keys in group A (see Fig. 4) are the digit keys, while those in group B are the multiplier keys. Those bearing the letters "D," "E," "T" and "P" are result keys, said letters indicating:

"D"=Decimal.
"E"=Extension.
"T"=Total.
"P"=Product.

A decimating key 361 marked "Dec." (see Fig. 3) is employed to eliminate unnecessary decimals in the product.

The error key 206 is employed to correct errors, as when an item is erroneously introduced into the machine.

I shall not describe in detail the key board identified with the typewriting mechanism shown in Fig. 3 as this is well known.

When a motor is employed in lieu of an operating handle, the key board may contain a "motor key."

*The typewriting mechanism.*

The typewriting mechanism consists of the usual key board whose keys are comprehended within the group C, to which keys are connected the usual keys and key bars 1. 2 is the spacing key of the typewriting mechanism which, with the keys and bars 1, operates a spacing bar 3 (see Fig. 2), connected to the escapement mechanism of the typewriter carriage. The typewriter carriage consists of a frame 4 mounted in suitable tracks, preferably ball bearing, and supports a platen 5. The typewriter carriage is provided with the usual escapement mechanism for letter-spacing. 10 is a hand lever to which a pawl (not shown) is connected for coöperating with a ratchet 12 on the end of the platen whereby the platen may be rotatively stepped in the operation of line-spacing. Other parts usual and common to a typewriter carriage are present, but they need not be described in detail.

The tabulating keys in group D identified with the typewriter carriage are the same as in the said Belgian patent.

*Operating the escapement by adding mechanism.*

The bars a which are connected to the keys of group A preferably converge and are mounted on a common pivot 21, said bars extending rearwardly beyond said pivot for purposes hereinafter to be described. Referring to Fig. 15 it will be seen that the ends of these bars extend under a plate 22 pivotally mounted in the free end of a yoke frame 23 pivoted on the rod 24. This yoke frame has a forward extension 25 which rests on top of the spacing bar 3 of the typewriter, see Fig. 2. In this manner if the carriage is positioned for any particular column, the operation of keys in group A will depress the bar 3 and actuate the escapement mechanism of the typewriter carriage; thus the typewriter carriage will be moved laterally, step by step, a number of spaces equal to the number of figures to be added in that column. The operation of the carriage escapement from the keys in group A is particularly useful in lineal addition, as there it is only necessary to strike the space key once after the printing of each number.

To lock the carriage against lateral movement in certain operations of the machine, as for instance, when vertical columns are being printed and computed, the stops positioned by the tabulating keys in group D (stops not shown) may be employed.

Figure 1:
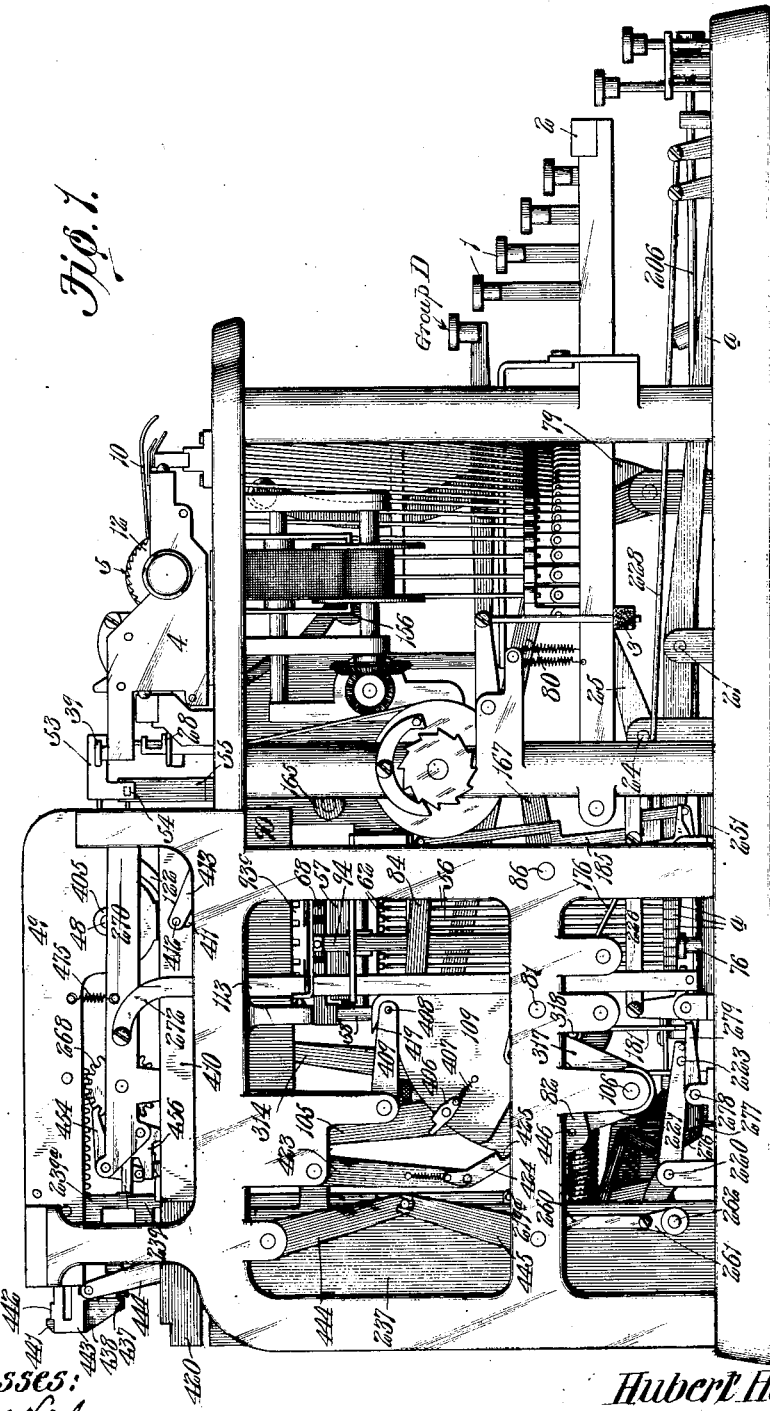
Figure 1 is a side elevational view of my improved calculating machine as seen from the left-hand side of the machine.

To line-space the platen when a series of items are successively printed in vertical-column order, the lever 28 and its associate parts (see Figs. 1 and 2) are employed as in the before mentioned patent. This line-spacing mechanism can be rendered inoperative where the machine is employed for lineal addition.

*Controlling the position of the forward totalizers from typewriter carriage.*

Referring to Figs. 3 and 31, it will be seen that the main frame of the typewriter carriage carries a notched bar 39, on which bar are arranged one or more adjustable blocks 40, which coöperate with a tappet 45 mounted on a sliding bar 46. This bar is connected at its rear end to an escapement lever 47, which escapement lever, when vibrated, permits the forward totalizers to revolve about the shaft 48.

Shaft 48 is mounted in two vertical frame plates 49. Instead of the forward totalizers being movable laterally with respect to the actuating devices, as in my aforesaid patent, my present machine contemplates the revolution of these totalizers about the shaft 48, which in this instance is fixed. A spiral spring 400 exerts tension to rotate shaft 48 (in the direction of the arrow, Fig. 32), and said shaft is provided with a disk 401 having as many projections or escapement teeth 402 as there are totalizers (in this instance, four). These teeth coöperate with the escapement lever 47 whose construction is best seen in Fig. 33. Normally one of the teeth 402 rests on the projection 47ª. When the block 40 engages the cam face of tappet 45 and moves the bar 46 rearwardly, the face 47ª is moved from under the tooth 402 which is permitted to drop onto the face 47ᵇ of the escapement pawl, and when the escapement lever 47 is moved forward again, as it will when the tappet 45 is released, the spring 400 turns the shaft 48 so that the next tooth 402 is brought into engagement with the face 47ª. In this manner the totalizers may be successively revolved into (and out of) engagement with the actuating devices as the adjustable blocks 40 on the typewriter carriage successively come into contact with the tappet 45 in the movement of the carriage from right to left. When the carriage is returned to its home position or moved from left to right it revolves the shaft 48 and its carried totalizers so as to position totalizer No. 1, as it might be called, in operative relation to the actuating devices when the typewriter carriage is in its home position. This is accomplished by means of a block 53 (see Fig. 1), which is provided with a downward extension coöperating with the end of a rod 54 mounted in suitable guides 55 secured to the top frame plate of the typewriting machine.

Rod 54 has a cable 403 connected to it, which cable passes around an idler 404 and also around a drum 405 fixed to the end of shaft 48. As the typewriter carriage leaves its home position at the right and travels leftward its adjustable blocks 40 successively engage the tappet 45 and operate the escapement lever 47. Spring 400 will rotate shaft 48, in this instance a quarter revolution, each time the escapement lever is operated. The drum 405 will wind up the cable 403 under the tension of spring 400 and rod 54 leftwardly. When the typewriter carriage is moved to the right it will engage bar 54, unwind the cable from drum 405 and wind up spring 400 for succeeding operations.

In the further description of the machine, no distinction will be made between the groups of forward totalizer wheels, as it is immaterial, so far as the operation of the adding mechanism is concerned, which particular group might be in operative position with respect to the actuating devices at any particular time.

*Setting up an item by the operation of the keys in group A.*

As before stated, the keys in group A constitute what might be termed the adding keys, and these keys are mounted upon the ends of key bars *a* which are pivoted at 21. The rear ends of these key bars are preferably deflected as shown in Fig. 4, and terminate respectively under the lower ends of vertical bars 56, see Fig. 78. Bars 56 are guided in their vertical movement by suitable guide plates and terminate at their upper ends beneath setting up devices in a transversely movable carriage (see Figs. 2, 5, 14 and 48).

The details of this carriage are best seen in Figs. 18 to 21, where it will be observed the carriage consists of a frame 57 provided with rollers mounted in tracks 58. These tracks are pivoted at one end to the framing of the machine (see Fig. 14), the opposite end of said track frame being supported upon a post 59 extending from one of the cross bars of the framing.

60 indicates a spring which constantly exerts an energy tending to move the setting-up carriage toward the left. The arrangement of the digit keys and their key bars is such that the rearmost vertical bar 56 is identified with the zero digit, the next bar with the "1" digit, etc., the forward bar being identified with the "9" digit key.

62 are the setting-up pins, one in each longitudinal series of which is lifted by the operated bar 56.

The means for restoring the pins to normal position is the cam bar 68, which tends to move the pins laterally for the purpose of unlocking them, and then force said pins down to their home position. Pins 62 constitute the setting-up devices and are located between the key board and the stops which directly control the movement of the adding machine parts.

57ª indicates a projection lying under the zero stop pins 93, and when the carriage 57 is lifted in the operation of the machine, to position the stop pins 93 according to the example indicated by the raised pins 62 of the traveling carriage, the zero stop pins to the left of the highest series containing an actuated pin will be raised, and all the racks identified with such high denominations will thus be prevented from movement.

Referring to Figs. 75 to 78, it will be seen that the operation of any of the keys in group A will rock the shaft 24 heretofore described. On this shaft 24 is mounted an escapement arm 71 which carries a fixed plate 72 occupying a position normally under the teeth of the toothed escapement segment 73. A pawl 74 is carried by arm 71 and normally engages the teeth of the segment 73. A spring 75 tends to force the pawl 74 to one side, the distance of one tooth, so that when the arm 71 is elevated the fixed plate 72 enters a space between two teeth, and the pawl 74 is released. When the arm 71 is depressed the pawl 74 enters the next adjacent space and permits the escapement segment, when the plate 72 is disengaged therefrom, to move the distance of one tooth. Thus the vibration of arm 71 enables the escapement segment 73 to rotate step by step. This segment 73 is fixed to a vertical shaft 76, which shaft carries at its upper end a segmental gear 77 meshing with a rack 78 on the traveling carriage 57. In view of the fact that the spring 60 is constantly exerting an energy to pull the setting-up carriage toward the left, it will be obvious that whenever a key in group A is depressed the traveling carriage will be held stationary by the fixed escapement plate 72, while the setting-up pin is being raised, and after the pin has been raised and when the key is released the depression of the arm 71 will permit the traveling carriage to move one step toward the left.

79 indicates an operating handle mounted on the frame of the machine and connected by a link 80 through a spring transmission to a rock shaft 81. On this rock shaft 81 is mounted a cam 82 (see Figs. 34 and 41), which cam, at its forward edge, carries a pin 83. In the path of this pin 83 is a detent 84 arranged on the end of a rock arm 85 pinned to a rock shaft 86. Shaft 86 carries a rock arm 87 on the end of which is connected a rod 89, the upper end of said rod terminating under the free end of the frame 58, see Fig. 41; thus, upon the initial movement of the handle the rod 89 is elevated, raising the frame 58 and its carried setting-up pins. The pin 83 traveling in an arc of a circle will only engage the detent 84 for a short part of its movement, and when said detent is released the frame 58 drops to normal position. When the pin 83 returns to normal position, as when the operating handle moves home, the pin 83 lifts the detent 84 without elevating the frame 58.

The raising of the frame 58 together with the carriage containing the setting-up pins operates the stop devices in the paths of the elevated pins, which stop devices are more clearly shown in Figs. 22 to 24 inclusive, and may be described as follows:

90 indicates frame bars which support cross bearers 91, on which cross bearers are channel-shaped supports 92 for the series of stop pins 93. These stop pins like the setting-up pins, are preferably connected together in pairs by springs, and may be elevated, one in each longitudinal series, by the pins 62. The stop pins 93 are not, however, locked in their elevated positions but held by friction under the energy of springs, as they only occupy such positions temporarily. The lower end of each stop pin or pair has a shoulder which extends toward its companion, and between these pairs of stop pins are the fingers of a restoring plate 93ᶜ, said fingers being in the nature of the fingers of a comb, the plate proper being pivoted to the frame of the machine, as shown in Fig. 22. Means for operating this plate consists of a bar 94, see Figs. 15 and 34, the lower end of which bar is pivotally connected to an arm 95 loosely mounted on the shaft 86. The end of this bar 95 carries a spring-pressed detent 96 provided with an inclined forward edge. A plate 97 pinned to the shaft 81 is provided with a pin 98 at its upper end, which pin, when the operating handle is pulled, is designed to travel in an arc of a circle, and in whose path is included the detent 96. On the forward stroke of the handle, to wit, when the pin 98 moves forwardly, the detent 96 is idly vibrated and consequently the arm 95 is not actuated. However, as the handle returns home and the pin 98 moves back to its normal position said pin engages the inclined face of detent 96 and depresses the arm 95, which, by means of the bar 94, depresses the plate 93ᵇ and restores the stop pins to their normal or lowered position. Plate 93ᶜ and its connected parts are held in an elevated position by means of a spring 98ᵃ, see Fig. 25.

The stop pins 93 are positioned upon the initial movement of the handle and are restored just before the handle completes its final or return movement. I do not deem it necessary to describe these details in this application as they are fully set forth in my aforesaid patent.

From the foregoing description it will be seen that when an example is introduced into the traveling carriage and the setting-up pins are elevated, the said traveling carriage has progressed step-by-step under the stop pins 93, so that when the completed item is set up on the key-board the traveling carriage with its setting-up pins occupies the proper relation with respect to the field of stop pins; that is, if the example was 123, the elevated setting-up pins will lie directly under the pins in the hundreds, tens and units columns in the field of the stop pins. When the frame 58 is elevated the setting-up pins will elevate corresponding stop pins 93 and position stops for the rack bars in exactly the relation to each other that the setting-up pins occupied. Thus, in the example 123, the stop pins 93 in the hundreds, tens and units columns will be positioned so as to arrest the rack bars in such position that this sum will be printed and registered in the totalizer wheels.

*Introducing an item into the forward totalizers.*

In my aforesaid patent the actuating devices for the totalizers were in the form of rack bars having fixed teeth, but in the present case these actuating devices are in the form of bars whose racks or gear teeth are movable independently with respect to their supports. I shall employ the reference numeral 100 to refer to these supports in the present case because they are similar to the racks to which this reference numeral is applied in my former patent. 100, therefore, indicates the slide bars capable of movement longitudinally the machine. These bars do not carry the printing type as in my former patent, but said printing type are carried by a type-carrying member connected to and movable with the part 100, and to all intents and purposes forming a part thereof. This type-carrying portion of the slide bar is provided with a shoulder 101 which is designed, on the forward movement of said bars, to engage with any of the stop pins 93 set up in the path of said shoulder. Means for actuating the rack bars consists of rocking levers 102 having a slot and pin connection with the bars (see Fig. 5). To these levers 102 are connected springs 103, which springs tend to pull the levers 102 and their connected rack bars forwardly.

104 indicates a restoring bar which coöperates with the levers 102 near their upper ends, said restoring bar being carried by levers 105 rigidly mounted on the shaft 106 upon which the levers 102 are loosely mounted (see Fig. 58). One of the levers 105 is provided with a roller 107 which extends in a cam groove in a cam 108 fixed on the shaft 81, whereby when the shaft 81 is rocked by the operating handle the levers 105 and their restoring bar are also rocked. When the restoring bar 104 moves forwardly the rack bars, or such of them as have been released, are also permitted to move forwardly until arrested by the pins 93. Of course, it will be understood that the bar 104 at each stroke of the handle moves to such position as to permit a full stroke of the rack bars, to wit, their full forward or "9" position. When the restoring bar 104 moves rearwardly incident to the return movement of the handle, said restoring bar picks up all of the levers 102 and their rack bars which may have moved forwardly, and restores said levers and said rack bars to their normal position.

In normal operation the released bars 100 move forward idly under the impelling action of their connected springs, when the restoring bar 104 permits them to do so. Said bars may thus occupy one of nine different positions, depending upon the position of the elevated stop pin in the series controlling the forward movement of said bar. The "0" or home position of said bar is controlled by the zero stop pins, and with regard to this it may be said that when the zero stop pins are elevated either as a result of the operation of the zero key in group A, or by the lifting device 57ᵃ, the rack bars do not move.

When the operating handle and the restoring bar 104 are at the limit of their forward movement means are provided for engaging the totalizer wheels with the rack bars, whereby when said rack bars are restored said totalizer wheels will be rotated in proportion to the distance of movement of the rack bars. I will first describe the ordinary operations of the machine in which items set up on the keys in group A are registered in any one of the forward group of totalizer wheels which may be in operative relation to the rack bars.

Fixed on the shaft 81 is a rocking plate 109 (see Figs. 34 to 40 inclusive), which is vibrated at each operation of the operating handle. The rear end of this plate is provided with a tappet 406 normally held in a radial position by a spring 407. The outer end of this tappet is stepped and is designed to coöperate with a pin 408 on the lower end of a bell crank lever 409 whose upper end has a slot and pin connection with a sliding bar 410. This bar 410 (see Fig. 40) is provided with an opening 411, the upper rear edge of which is inclined as shown by dotted lines. In this opening operates a pin 412 on the end of a rock arm 413. This rock arm is connected to a rock shaft 414 which carries two arms 415. Arms 415 support plates 416 whose upper ends are bent inwardly toward each other, as shown in Fig. 41ª.

417 (see Figs. 12 and 40) are the heads of a spool-shaped carrier mounted on the shaft 48. The heads of this carrier are provided with radial slots through which project the ends of the shafts on which the forward totalizer wheels are mounted. The ends of these shafts are connected together by springs 418 whose combined energies tend to hold the totalizer shafts inwardly. As the spool-shaped carrier with its contained totalizers is rotated to bring said totalizers successively into relation with the actuating devices the projecting shafts of said totalizers are successively brought under the inwardly bent upper ends of the plates 416.

After an item has been set up on the pins in the traveling carriage, the first movement of the operating handle sets up the proper stop pins 93, and the restoring bar 104 permits the proper actuating devices to move forward until arrested by the positioned stop pins. When the handle reaches the forward extremity of its movement and starts rearwardly, the shouldered end of tappet 406 on the cam plate 109 engages under the end of the pin 408 in a manner similar to that illustrated in Fig. 37. When the handle starts its return movement, the spring 407 pulls the tappet, which has been displaced, back to its radial position, as shown in Fig. 38, and the bell crank lever 409 is actuated, moving the slide bar 410 to which it is connected rearwardly or to the left, as shown in Fig. 40. The action of the tappet 406 in actuating the bell crank lever 409 is similar to that of a toggle, the toggle straightening from the position shown in Fig. 37 to the position shown in Fig. 38, which latter figure illustrates the pin 470, the pivot binding the tappet 406 to the shaft 81 in a line of "dead centers" as it is termed in mechanics. The bell crank 471 is left in this position until the cam face 419 engages the pin 470 and actuates the bell crank lever 471, effecting a disengagement between the wheels 119 and their respective racks. The spring 407 is not strong enough, nor is it relied upon for any purpose except to normally hold the tappet in its radial position. This movement of slide bar 410 rocks the arm 413 and depresses the plates 416, placing the pin 412 under the horizontal forward upper edge of the slot 411. When the parts are in this position the forward totalizer, under control of the plates 416, is depressed into engagement with its actuating devices, and so held until the cam face 419 on the hooked forward end of cam 109 engages the pin 408 on the bell crank lever and moves the bar 410 forwardly, permitting the forward totalizer to be disengaged from its actuating devices. It will be noticed in this connection that this disengagement occurs just prior to the handle reaching the rearward limit of its movement. It will also be noticed that the rear end of slot 411 in which the pin 412 operates is enlarged so that in the total-taking operation the pin 412 may be moved vertically to permit the forward totalizer under control of the plates 416 to be engaged with the actuating devices before the handle is moved forwardly.

*The carrying mechanism for the forward totalizers.*

By referring to Fig. 5 it will be observed that the heads 417 through which the totalizer shafts project are connected by a sleeve 417ª, which sleeve is provided with longitudinal grooves for receiving and locking the forward totalizer wheels against rotation at all times except when they are depressed by the plates 416. The forward totalizer wheels 119 have ten teeth and each wheel is provided with a tripping projection 120 at the left.

121 are the tripping pawls which are designed to be depressed by the projections 120, and when depressed said tripping pawls permit the lower stepped end of a restraining pawl to engage a lateral projection 121ª on the tripping pawl and hold said tripping pawl in its depressed position. When so held the cam face 121ᵇ of the tripping pawl lies in the path of the bent end of a latch lever 124, said latch lever being pivotally mounted on the sliding rack section 125 which is carried by the actuating slide bar 100. The slide bar 100 is provided with a lateral projection 126 which is normally engaged by the latch lever 124, whereby the rack 125 is held forward and against the spring 127 which tends to pull it rearwardly.

In Fig. 6 the parts are shown in the position they assume when the tripping pawl is depressed and held depressed by the restraining lever 122. Whenever the tripping pawl is actuated the slide bar 100 and its carried rack 125 are of course in other than home position, and consequently the latch lever 124 is not operated. The parts may, however, be in a position in which the actuating bar 100 is practically at its home position when the carrying pawl is tripped. If the parts are in such position, or if the pawl 121 is depressed when the latch lever 124 is located some distance in advance thereof and beyond its influence, the restoration of the bar 100 and its carried rack 125 will bring the rear end of the latch lever 124 in contact with the cam face 121, depressing the same and causing the forward end of the latch lever to become disengaged from the projection 126 (see Fig. 7). The spring 127 now acts to pull the rack 125 one tooth to the rear, and said rack being in engagement with the next adjacent adding wheel of higher order will move said adding wheel one tooth in advance and effect the carrying. The means for limiting the rack 125 in its rearward movement so that it will be arrested after it has completed its "one tooth" movement may be the forward end of the rear rack 453, see Fig. 5, or a special pin or shoulder in the slide bar may be provided. At no time in the operation of the machine is it possible for the racks 453 to stand displaced in the act of carrying when the racks 125 are displaced, and hence the forward ends of racks 453 constitute effective stops for arresting racks 125 in their displaced positions. The tripping projections 120, as before stated, are on the left-hand side of the adding wheels, and thus whenever said tripping projections depress the tripping pawls under their control the next adjacent adding wheel of higher order will be advanced a distance of one tooth. The forward totalizers thus stand fully carried at the end of each handle stroke.

The latch levers 124 as they ride down the inclined face 121, come in contact with the front edge of the restraining pawl 122 and push the said pawl behind the projection 121ᵃ, thus releasing the tripping pawl and permitting it to rise after it has finished the work of operating the tripping lever.

The carrying mechanism above described is not exactly of the same type as that illustrated in my aforesaid patent, but I have used similar reference characters in referring to corresponding parts.

In order to restore the racks 125 and reestablish engagement between the latch lever 124 and the projection 126, I arrange a sliding bar 420 (see Figs. 13, 15 and 53 to 55 inclusive), which bar has an arm 421 extending behind projections 125ᵃ extending up from the racks 125.

423 indicates a lever having a slot and pin connection with the bar 420, said lever being provided with a shouldered tappet 424 on its lower end which coöperates with a projection 425 on cam plate 82.

When the parts are in the position shown in Fig. 2, and the machine is at rest, the instant the handle starts forward (as shown in Fig. 54) the lower end of the tappet will be swung upwardly so as to rock the lever 423 and slide the bar 420 forwardly. This forward movement of the bar 420 causes the arm 421 to restore its controlled racks. From the above description it will be seen that when the handle is home some of the racks 125 may stand displaced, but this does not make it necessary, in this machine, to give to the handle an extra stroke so as to restore the racks before pressing the "T" or total key preparatory to obtaining a total, as is usual in other types of machines (like the Burroughs) possessing the characteristic of displaceable racks. It is not necessary, in my machine, to give the handle an extra stroke to replace the racks, because the displaced racks are independent of the printing type, which remain in their normal position when the racks are displaced; and as the racks are displaced the distance of one tooth, and are against solid stops on their slide bars (which latter carry the printing type) they mesh with the wheels 119 and control the position of the printing type just as if they had never been displaced.

*The printing mechanism.*

The slide bars 100 are spaced comparatively far apart to permit the shouldered bars of the multiplying mechanism to pass between them. This wide-spacing of the bars 100 is not desirable with respect to the type carriers, and therefore the type carriers which are connected to and operated by the bars 100 are arranged close together, as shown in Fig. 28, said bars diverging at their rear ends and being connected to slide bars 100 100, preferablyl by a slot and pin connection, as shown.

Figure 29:
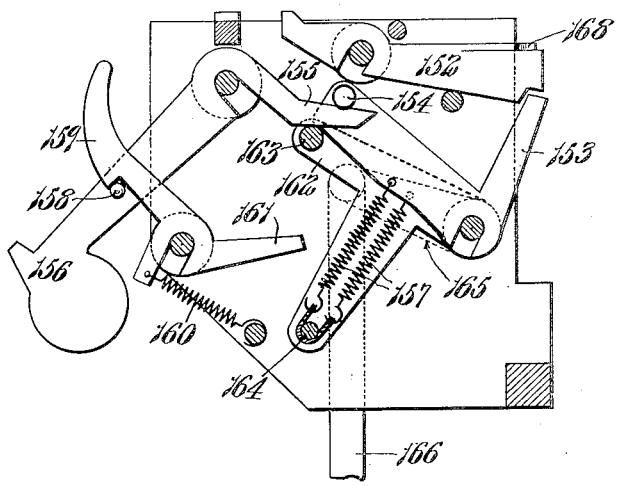
Fig. 29 is a side elevational view of the type hammers and their associate parts.
Figure 30:
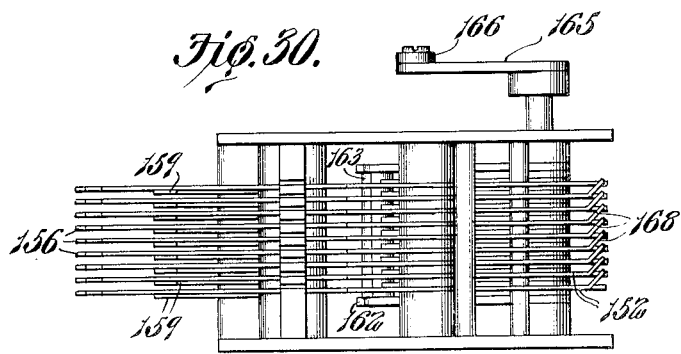
Fig. 30 is a top plan view of the type hammers and their associate parts.

Referring to Figs. 26 and 29, it will be seen that each of the type carriers is provided with a notch 151 which coöperates with a selecting and restraining pawl 152. The rear end of this restraining pawl, when the rack bars are home, engages the member of a bell crank lever 153 whose forward member carries a pin 154 resting upon a tail piece 155 of the type hammer 156. Springs 157 preferably arranged in pairs are connected to the forward member of the bell crank lever so as to draw the same down whenever the rear member thereof is released by the restraining pawl 152. Each type hammer is provided with a pin or projection 158 which coöperates with the hooked end 159 of a bell crank lever which is held in its engaged position by a spring 160. This bell crank lever has a rearward extension 161.

Mounted on the shaft on which the bell crank levers 153 are mounted is a rock arm 162, said rock arm carrying a bar 163 which lies under all of the rearwardly extending projections 155 of the type hammers, said bar also traveling in a path into which extends all of the rearwardly extending projections 161 of the type hammer pawls.

These arms 162 are provided with extensions in which is mounted a rod 164 to which one end of the hammer-actuating springs 157 is connected.

In operation, whenever a slide bar 100 moves forward the rear end of the restraining pawl 152 is raised out of engagement with the member 153 of the bell crank lever and consequently the pin 154, under the pulling action of the springs 157, bears upon the rearward extension 155 of the type hammer. As the operating handle moves forward and after all of the type bars are positioned the bars 163 and 164 are depressed, the latter increasing the tension of the springs 157, and the former eventually striking the projections 161 and lifting all of the hooked pawls 159 out of engagement with the printing hammers. In this manner any of the printing hammers which may have been previously released by the restraining pawls 152 are thrown up against the type, forcing the type to make a printing impression on the paper supported by the platen in the typewriter carriage. As the bar 163 returns to its normal position, it will restore all of the actuated type hammers to normal position, reëngaging the hooked pawls 159 therewith, and at the same time swing all of the bell crank levers through the pins 154, so as to place the rear members of said bell crank levers in position to be engaged by the restraining pawls 152 when the rack bars are restored home.

The means for vibrating the arms 162, which arms carry the bars 163 and 164, consists of a rock arm 165 preferably arranged outside of the side frame plate which houses in the printing mechanism, and to which is connected a link 166, the lower end of said link being connected to a rock arm 167 loosely mounted on the shaft 86. This arm 167 is connected to a rearwardly extending arm 167ᵃ which carries a pin 167ᵇ arranged in a cam slot in cam 82 so that the vibration of said cam will operate said parts.

In view of the fact that when the zero key in group A is operated it sets up a stop which prevents any movement of a type bar, it will be obvious that the zero type on said bar which is thus held stationary in printing line, will not print unless the printing hammer identified with said bar is released. This is accomplished by means of a series of bent lips 168 which are provided at the upper rear edges of the restraining pawls 152. The lips of the several restraining pawls overlap their adjacent companions in the next higher order, and consequently if any pawl of higher order is released by its type bar moving forward, said pawl will operate its companion in the next lower order and said companion will in turn operate the next pawl in the next adjacent lower order, and so on, releasing all the pawls 152 and consequently permitting all the printing hammers controlled by said pawls to be operated to the right of any actuated rack bar.

*Taking a total from the forward totalizer.*

The operations about to be described are applicable to the four groups of totalizer wheels 119, but for the sake of simplicity the description will be confined to any one of the four groups which happens to be in operative relation with the rack bars at the time the total is taken.

I have heretofore referred to the "T" key as the total key. This key is connected to a bell crank lever 169 (Figs. 4 and 41), which bell crank lever is connected by a rod 170 to a coupling 171 carried by the upper end of a rocking lever 172. A companion rocking lever 173 is pivotally mounted upon a lug secured to the base casting, and the upper ends of these rocking levers are connected by a link 174. The purpose of this construction is to impart parallel motion to link 174. Whenever the total key is depressed this link is moved forward and a projection 175 thereon is located in front of a plate 176 pivotally mounted on the framing of the machine. The purpose of this construction is to lock the total key in its depressed position while the operation of taking the total is being performed.

On the lever 173 there is a projection 177 which coöperates with a pin 178 on the lower end of a bar 113, connected at its upper end to rock the arm 413 heretofore referred to. When the total key is depressed the plates 416 will cause the wheels of the totalizer under their control to engage with the racks 125. When the handle is pulled forward the racks rotate the total wheels reversely until the tripping projections 120 strike against the rear edge of the pawls 121 to arrest the movement of the wheels and determine their zero position.

In the ordinary operations of the machine, as described with respect to the construction illustrated in Fig. 40, the initial rearward movement of the handle from its forward position will rock the cam 109 and cause the plates 416 to effect an engagement between the totalizer wheels and the racks 125, and maintain such engagement during the restoration of the racks to home position. This would of course retain the total in the wheels 119 and said wheels would never stand clear unless some means were provided to prevent the cam plate 109 from performing its usual functions. This means consists, as in my aforesaid patent, in a rearward extension 179 on lever 173, which extension lies under one member 180 of a bell crank lever, whose other member 181 lies between the flanges of the sleeve 182, to which the cam 82 and the plate 109 are fixed (see Figs. 16 and 41). Thus, when the bell crank lever 180—181 is rocked by the depression of the total key, the plate 109 is moved longitudinally the shaft 81 and out of line with the pin 408, so that its tappet 406 cannot coöperate with said pin; consequently when the handle is pulled, in total-taking operations, the plate 109 vibrates idly.

Means are also provided for preventing an item which might be set up in the traveling carriage from being introduced into the stop pins 93 and interfering with the taking of a total, but as these form no part of my present invention and are fully described in my aforesaid patent I shall not describe the same here.

If it is desired to clear the totalizer from which the total is being taken, the total key is permitted to rise when the handle reaches its forward limit of movement by reason of the operation of the plate 176 by pin 186a (see Fig. 34). If it is desired to retain the total in the machine, the total key is held depressed while the handle returns to its home position. I do not deem it necessary to describe the means for cushioning and compelling a full stroke of the handle, nor the error key construction in this application as the same is fully described in my former patent and forms no part of my present invention.

*The decimal key.*

This key, which bears the character "D," is connected to a rod 340 (see Fig. 4), which rod is connected to a lever 341 (see Fig. 43) carrying a rod 342 at its upper end, said rod being also supported by a lever 343. Rod 342 carries a shoulder 344 at its upper edge forming a track for raising the plate 176 when the "D" key is pressed, and thus if any of the other result keys "E," "T" or "P" have been operated, and it is desired to release them, the "D" key may be operated to accomplish this purpose. It will be noted that the track 344 does not permit the "D" key to be locked in a depressed position because none of the devices under the control of the "D" key are ever permanently positioned in the machine.

The under-side of bar 342 is slotted to receive one member 345 of a bell crank lever whose other member 346 is connected thereto by a vertical shaft mounted in a suitable post. See Fig. 15. The upper member 346 is connected to a sliding sleeve 347 forming the hub of the arm 85. As before described, the arm 167 is rigidly connected to the arm 167a whose pin 167b operates in a slot in cam 82. See Figs. 34 and 43. The purpose of maintaining operative relation between the pin 167b and the slot in cam 82 during the time that said cam 82 is displaced by the "D" key is to insure the operation of the printing mechanism notwithstanding the lateral displacement of cam 82. The arm 85 which carries the tappet 84 for effecting the lift of the track frame 58 is mounted by a slot and pin connection on shaft 86 so as to rotate with the shaft, and at the same time be moved laterally with the arm 167 and maintains operative relation between the tappet 84 and its operating pin 83.

The lever 343 is provided with a rearward extension 348 which lies under the member 180 of the bell crank lever, whereby when said lever 343 is rocked the bell crank lever is operated so as to shift the plate 109 and cam 82 to the third position, wherein the plate 186 registers with the outermost slot in post 188 and insures the maintenance of the shifted position of plate 109 and cam 82 during the forward pull of the handle.

349 indicates a branch rod connected to the "D" key, which rod as shown in Figs. 4 and 44, is also connected to a rock arm 350 on which is mounted the plate 22 of the escapement yoke, which plate, as before described, lies over the rear ends of the bars of the keys in group A. These key bars, as shown in Fig. 78, are notched in their upper edges so that when the "D" key is depressed and plate 22 rocked forward, operation of keys in group A will not actuate the escapement mechanism which steps the traveling setting-up carriage from right to left. Thus, if it is desired to set up on the keys in group A 25.5, the keys for the whole number are operated and then the "D" key is pressed while the "5" key in group A is operated, which results in bringing into action a decimal slide bar 100a (see Fig. 14) which lies at the right of the units bar 100 heretofore described. This decimal slide bar is normally inactive in the ordinary and usual operations of the machine, but is brought into action when the "D" key is operated by the arrest of the traveling carriage and the setting-up of a pin therein, which pin occupies a position one column order to the right of what it would occupy had the escapement mechanism operated. In other words, in the ordinary operation of the machine when a key in group A is depressed a pin 63 is set up in the carriage, and then when the key is released the carriage travels one step to the left. In the example under consideration the "2" and "5" keys in group A have been operated and the proper setting-up pins in the first and second series at the left have been advanced under the tens and units rack bar. When the "D" key is depressed the escapement mechanism is thrown out of operation and consequently when the "5" key in group A is depressed the carriage cannot travel but will remain stationary with the setting-up pin in the third series from the left positioned under the tenths decimal rack bar.

When the operating handle is pulled, the stop pins 93 are set, there being a series for the tenths decimal rack bar as well as the rack bars identified with whole numbers, and consequently the tenths decimal rack bar is moved forward and operates the same as the other rack bars. There is also a wheel in the totalizers for coöperating with the tenths decimal rack bar. The printing type of the tenths decimal rack bar are each preceded by a decimal point, as shown in Fig. 28, so as to indicate the fact that the number printed by the type characters on this bar are decimals.

The above description of the tenths decimal rack bar and its means of control applies to the construction illustrated in my former patent. I will now describe the means whereby the hundreths decimal bar is brought under control of the key board.

The plate 22 which is in register with the notches in the rear ends of the key bars in group A whenever the "D" key is depressed (see Figs. 44 and 78) carries an extension 426 in which is arranged a pin 427. This pin extends into a slot in the lower end of a bar 428, which bar is provided with a rod 429 normally registering with the recesses in the rear ends of the key bars of group A.

In the ordinary operation of the machine, when the "D" key is not operated, the plate 22 is lifted to operate the escapement mechanism for the traveling carriage, and the bar 428 remains stationary, pin 427 moving idly in its slot. However, when the "D" key is operated the plate 22 is thrown into registration with the notches in the key bars so that the escapement mechanism will not operate, and the rod 429 is moved out of the path of said notches and into position to be operated by the elevation of any of the key bars in group A.

In the ordinary operation of the machine the depression of a key in group A will set up a pin 62 and then as the digit key is released the carriage will step over, placing the set-up pin 62 under the stop pins 93 which control the units slide bar 100 (see Fig. 24).

When the "D" key is depressed the traveling carriage will not be permitted to step to the left, and consequently the pin 62 which is set up will remain under the series of stop pins 93 which control the tenths decimal slide bar.

The bar 428 is employed to place the hundreths decimal slide bar under control of the key board. This is accomplished as follows: The upper ends of the lifting bars 56, which engage and position the setting up pins 62, pass through guiding openings in an arm 430 (see Figs. 45-48) extending from a cross arm 431 mounted in suitable guide ways to slide transversely the machine. A spring 432 tends at all times to pull the bar 431 and its guide arm 430 to the right. A shoulder 433 is provided on the bar 431. The upper end of bar 428 normally rests in front of this shoulder, so that the spring 432 holds said shoulder up against said bar. When, however, the bar 428 is lifted a notch 434 in the upper end thereof is brought into registration with the shoulder 433 and the spring 432 is permitted to pull the bar 431 the length of its guiding slots, in which position the upper ends of the lifting bars 56 are shifted to the right so as to lie under the series of setting up pins 62 relatively one step to the right of the series that is normally under control of said bars.

When the "D" key is depressed and the bar 428 lifted in setting up a pin 62 in the control of the tenths decimal slide bar, the bar 56 will lift its pin 62, and said pin will be positioned before the notch 432 registers with the shoulder 433. Hence there can be no shifting of the bars 56 to put them in control of the hundredths slide bar until after a pin in the series controlling the tenths slide bar, that is, either the zero pin or one of the series from "1" to "9" is positioned. When the registration between the notch 434 and the shoulder 433 occurs, the spring 432 shifts the upper ends of the bars 56 so as to place them in control of the next series of pins at the right, being the ones which at this time are in control of the hundredths decimal slide bar. The operation of a digit key in group A will now position one of the pins 62 under control of the bars 56 (the traveling carriage of course not moving while the "D" key remains depressed), and when the handle is pulled the pins 62 which are positioned will lift the stop pins in the paths of the respective bars which they control.

In the drawings (see Fig. 14) I have marked the slide bars which are identified with whole numbers such as units, tens, hundreds, etc., with the reference numeral 100; the tenths decimal slide bar is indicated by 100$^a$; and the hundredths decimal slide bar by 100$^b$. The stop pins which control the tenths and hundredths decimal slide bars are marked 93$^a$ and 93$^b$ respectively.

In view of the fact that any series of pins 62 may coöperate with the stop pins 93, 93$^a$ and 93$^b$, no distinction is made in the reference characters to these pins.

Normally the carriage lies with the first two series of pins at the left under the pins 93$^a$ and 93$^b$ of the field of stop pins; hence it is possible to introduce the decimals into the machine by first pressing the "D" key and then striking one or two digit keys according to the demands of the occasion, the first key depressed controlling the tenths decimal slide bar and the second key depressed controlling the hundredths decimal slide bar. It is of course obvious that in the operation of this machine, like in the operation of the machine illustrated and described in my former patent, whole numbers may be written and computed as such regardless of the decimal rack bars under their control.

It is of course obvious that in the introduction of an item into the machine containing two decimals the "D" key must be depressed before the tenths decimal is struck on the key board, the "D" key being held down while the hundredths decimal is struck on the key board; otherwise the release of the "D" key would bring the traveling carriage under control of the key board and it would be stepped over and the shift of the bars 56 be rendered ineffective so far as any control of the hundredths slide bar is concerned.

In listing a series of mixed numbers in a vertical column, such as whole numbers and fractions, or dollars and cents, as, for instance, in the following example:

```
        .05
        .50
      12.00
      ─────
      12.55
```

To set up the first item, the "D" key would be depressed, then the zero key, and then the "5" key, and the handle pulled. To set up the second item, the "D" key would be depressed, then the "5" key, and the zero key (if it was desired to print the zero hundredths), and the handle pulled. To set up the third item, the "1" and "2" keys would be depressed, then the "D" key, then the zero key pressed twice, and then the handle pulled. If the operator does not care whether the unnecessary zeros in the second and third items shall appear in the printed record, the zero keys need not be pressed. To obviate the necessity of pressing the zero keys to set up stops for the tenths and hundredths decimal bars, means shown in my former patent consisting of the plate 351 and its associate parts may be used; but I have not illustrated the same in this present machine as I do not deem its presence necessary in a dollars and cents machine.

To restore the shifted upper ends of the bars 56, which means shifting the plate 431 to its normal position, there is provided a bell crank lever 435 (Fig. 46) which is pivoted to the track plate 58 on which the traveling carriage 57 is mounted. The right-hand end of the traveling carriage in the path of the upper end of this bell crank lever is provided with a cam face 436, and as the carriage is restored to its home position, which occurs every time the handle is operated (if the carriage has previously been stepped leftward), the cam face 436 engages the bell crank lever and shifts the plate 431 to its normal position, in which position the bar 428 will drop in front of the shoulder 433 and place the notch 434 out of registration therewith.

*Setting up the multiplicand in the multiplying devices.*

Operating any of the keys in group A and depressing the "E" key will set up the multiplicand in the multiplying devices. This is accomplished as follows:

The "E" key in the present case is equivalent to the "R" key in my aforesaid patent, so far as this operation of setting up the multiplicand into the multiplying devices direct from the keys in group A is concerned. Each of the slide bars 100 is provided with a depending projection or tooth 100$^x$ at its rear end (see Fig. 49), which is designed to fit in the recess in its associated pendant 235. Pendants 235 are mounted to slide on arms 236 extending rearwardly from the stop bars 239 carrying the stepped stop projections 243 at their upper ends, as shown in Fig. 5. In order to engage the pendants 235 with the slide bars 100, whereby said pendants may be positioned upon the operation of said slide bars, I provide the following instrumentalities:

The rock shaft 220 (see Fig. 49) is connected by a link 219 to a lever 219$^a$, the opposite end of said lever being located under the bars 239.

Rock shaft 220 is provided with a rock arm 221 carrying two pins 222 and 223, the latter of which is arranged over an extension 224 of the lever 225 connected to a bar 226 whose forward end is mounted on a lever 227 and connected to the "E" key by a rod 228. Thus when the "E" key is depressed the lever 219$^a$ is vibrated and all of the bars 239 (and their companion bars 239$^a$ hereinafter referred to) are raised so as to engage all of the pendants 235 with the slide bars 100. When the handle is pulled forward so as to permit the movement of the slide bars 100 and their pendants 235 forwardly, said slide bars will be arrested by the stop pins 93, and the moved pendants 235 will be located over the appropriate cross arm 247 (Figs. 5 and 59). The pendants 235 are permitted to drop out of engagement with the slide bars 100 after they have been positioned by operating the plate 176 heretofore described, which plate cooperates with the projection 229 on the bar 226 (see Fig. 49). Lever 176 is operated by means of a pin 186$^a$ on the cam extension 186 mounted upon the hub 182 which carries the cams 82 and 109. When the handle reaches the forward limit of its movement the "E" key is permitted to rise and the pendants permitted to drop.

237 are the side plates of the housing in which the multiplying devices are mounted. The arms 236 of the stepped stop bars heretofore described are guided vertically by means of grooves in a plate 241. All of the slide bars 100 are provided with projections 242 at their rear ends for coöperating with the shoulders on the upper sides of the stepped portions 243 of said bars. There are ten of these stopping faces, including the rear edge of the bar which coöperates with the projection 242. It will be obvious that if the bar is lowered so that the end of its extension 243 lies in the path of the projection 242, the bar, if released, cannot move forwardly because it then occupies a zero position. If, however, the bar is lowered one step, the projection 242 will coöperate with the first shoulder, and so on until the pin coöperates with the rear edge of the bar, which is the "9" position of the stop bar. For convenience of reference, the shoulders of the stop bar in Fig. 5 have been numbered according to the positions they permit their coöperating slide bars to occupy when the projection 242 comes in contact with said shoulders.

Referring to Figs. 59 and 60, 244 indicates lowering bars mounted on one side of the multiplying mechanism and guided in their vertical movement by rollers 245 mounted near the top of the housing. Each lowering bar (and there are twenty of said bars in this case, instead of ten as in my former patent), is provided with a cross arm 247 whose opposite end is guided in grooves in the opposite side plate of the housing. Cross arms 247 coöperate with the pendants 235 and permit them and the stepped stop bars, which they control, to be lowered until arrested by the selected multiplying plate whose shoulders lie in its path.

For purposes of distinction I will hereafter refer to the stepped stop bar 239 and its associate parts, (Fig. 64) which coöperate with the slide bars 100, as the units partial product stop bar. For every units partial product stop bar there is a complementary tens partial product stop bar, which I have numbered 239$^a$ in the drawings, using the designating letter $a$ to indicate corresponding parts associated therewith, as, for instance, the track arm 236$^a$ on which is mounted a pendant 235$^a$ and the stepped stop arm 243$^a$ which controls the tens partial product rack.

The twenty lowering arms 247 heretofore described are operated in couples or pairs, and in turn coöperate with the coupled pendants 235 and 235$^a$ positioned thereover. The units partial product stop bar and its complementary tens partial product stop bar are also operated in couples.

*The multiplying mechanism.*

It might be well to preface a detailed description of the multiplying mechanism with the statement that whenever a multiplicand is set up in the multiplying devices either directly from the key board, as heretofore described, or transferred from one of the forward totalizers by depressing the "E" and "T" keys and pulling the handle, which is fully set forth in my aforesaid patent, the said number so introduced into the multiplying mechanism is set up two orders lower; that is, if 125 yards was to be multiplied by $.05, the 125 yards would be set up in the multiplying mechanism two orders to the right, so that the decimal would be automatically located. This is equivalent to setting up the 125 yards as 1.25 and multiplying it by 5 to obtain the product, 6.25; or setting up the number 125 as a whole number and multiplying it by .05 and then stepping the product totalizer to the right two spaces to place the decimal in the proper position to obtain the correct answer, 6.25.

By referring to Fig. 63 it will be seen that the clearing rack bars which do not coöperate with the stepped stop bars 239—239$^a$ are indicated by the characters 100$^d$, 100$^e$, 100$^f$, 100$^g$ and 100$^h$. The thousandths and tenths of thousandths slide bars 100$^c$ and 100$^d$ are each provided with stops 242, whereby said bars are under control of their associate stop bars 239. The pendants which are carried by these last mentioned stop bars 239 (and their associate "tens" stop bars 239$^a$) are controlled by the tenths and hundredths decimal slide bars 100$^b$ and 100$^c$ respectively (see Figs. 63 and 64). This control of the units and tens partial product pendants two orders below the number set up is accomplished by off-setting the tooth 100$^x$ at the rear end of the slide bars 100, 100$^a$ and 100$^b$.

To illustrate this by reference to the example heretofore referred to, to wit, multiplying 125 yards by .05: If the 125 yards was set up as a whole number it would be automatically transposed to two orders lower and appear in the multiplying devices as 1.25, that is, the pendants which are positioned would be the pendants which control the tenths and hundredths decimal slide bars and the units bar.

If the example under consideration was 125¼ yards the fraction would be set up as a decimal (.25), and this would position the pendants which control the thousandths and tenths of thousandths bars 100$^c$ and 100$^d$ (see Fig. 63). If this number is multiplied by .05, the "5" multiplier key is depressed the product of 125.25 multiplied by .05 is 6.2625, but as the last two figures of the decimal are eliminated, the clearing racks not containing printing type, the product will be printed as 6.26.

The tenths stop bar 239$^a$ (see Fig. 5) has its shouldered arm 243$^a$ arranged in front of a lateral projection 437 on the lower rear end of a tens partial product rack 438.

This rack is slotted and mounted on appropriate guide bars 439, said rack being pulled forwardly by a spring 440 and being held rearwardly by a shoulder 441 coöperating with a restoring bar 442. This tens partial product rack is normally in engagement with the teeth of the wheels 268 of the product register, and is designed upon the forward stroke of the handle, if its controlling stop bar 243ª is lowered, to rotate the meshed wheel 268 proportionate to the movement permitted by the tens partial product stop arm 243ª. The restoring arm 442 referred to (see Figs. 12 and 51) is carried by a slotted guiding bar 443 which is practically a blank rack, said bar having a slot and pin connection with a lever 444. The lower end of lever 444 has a slot and pin connection with one member of a bell crank lever 445, whose other member is provided with a cam groove (see Fig. 52), in which is located a pin 446 on the cam plate 82. The cam plate 82 is operated at each operation of the handle, and when shifted laterally by any of the multiplier keys in the operation of multiplying, the pin 446 will enter the slot in the bell crank lever 445 and operate the restoring bar 442. At all other times the racks 438 are stationary and serve as locking means for the wheels 268 when said wheels are out of engagement with the lower racks which also coöperate with them.

Only those racks 438 are permitted to move in the operation of introducing the tens partial products into the wheels 268 whose controlling stepped arms 243ª are depressed. All other racks are prevented from forward movement by the rear ends of the arms 243ª which lie in their paths and constitute zero stops. When a number is set up in the multiplying devices the pendants 235 and 235ª constituting a pair, are coupled together by the long tooth 100ˣ of the slide bar 100 with which they are engaged, and said pendants are moved forwardly over a pair of cross arms 247. When the coupled pendants which have been moved forward are permitted to drop out of engagement with their positioning tooth on the slide bar, said pendants rest upon a pair of cross arms 247 identified with the respective digits, that is, both pendants would coöperate with the cross arms identified with the "1" digit, the "2" digit, etc. All of the cross arms 247 are lowered simultaneously, and all of the pendants supported thereby will be lowered with them to such position as may be determined by the tens and units partial product shoulders on the multiplying plates 447. These multiplying plates, as shown in Figs. 65 to 74 inclusive, are provided with twenty stop shoulders coöperating with the twenty cross arms 247.

Every alternate cross arm is identified with the units partial product shoulder in line with the units partial product cross arm 247 which supports the units partial product pendent 235 which controls the units partial product stop arm 239, which determines the movement of the units partial product rack for actuating the wheels 268. The remaining alternate shoulders are the tens partial product shoulders and control the corresponding parts for the tens partial product racks. Thus whenever a pair of tens and units partial products pendants are positioned over a pair of tens and units partial product cross arms, and lowered, the tens and units partial product stop arms will be simultaneously correctly positioned to control the tens and units partial product racks. This simultaneous positioning of the parts identified with the tens and units partial products is new, so far as I am aware. I will now describe how a multiplying plate 447 correctly determines the position of the above described parts.

If it is desired to multiply 654 by 9, the operation is as follows: 654 may be set up on the keys in group A, the "E" key pressed and the handle operated. This number is set up in the multiplying devices two orders lower, as above described, the coupled pendants of the units slide bar being moved to the sixth position, the coupled pendants for the tenths decimal slide bar being moved to the fifth position, and the coupled pendants for the hundredths decimal slide bar being moved to the fourth position. The "9" key in group B is now depressed and the handle operated once to effect the complete operation of multiplication. In my former patent it was necessary to operate the handle twice to effect the multiplying operation.

When any key in group B is depressed, said key, by means of its connecting rod 250 (see Fig. 4), operates a bar 251 (see Fig. 59) which has a slot and pin connection with a lifting lever 448, which lever extends under a pin on the lower end of the shank of the multiplying plate 447 and lifts its controlled plate. There is a multiplying plate for each multiplier key, and whenever a multiplier key is operated the plate controlled thereby is lifted above its companions by means just described, and held in its elevated position by means of a pawl 449 which engages under a shoulder in the rear edge of the shank of the plate. The pawls 449 are independently moved for each plate, and when the handle is operated to effect the operation of multiplication the operative pawl 449 is displaced so as to permit the selected plate to drop back to its normal position. The means for restoring pawl 449 is shown in Figs. 61 and 62, and consists of a bar 450 extending under all of the pawls 449 and connected to a tappet 451.

which tappet normally lies in the path of a pin 452 in the end of a rock arm on shaft 262. Shaft 262 carries a pinion 263 meshing with a segment 264 mounted on shaft 106 (see Fig. 2). This segment is provided with an extension having a pin 265, which coöperates with a cam 266 mounted on shaft 81. By this means whenever the handle is operated the shaft 262 is rocked, the forward movement of the handle causing the pin 452 to ride under the tappet 451 in the direction of the arrow in Fig. 61, without displacing the holding pawl 449. As the handle approaches the limit of its rearward movement, as indicated by the arrow in Fig. 62, the pawl 449 is displaced, as shown, and the multiplying plate permitted to drop. The pin 452 rides under the tappet just before the handle reaches its home position. All of the above described parts are also shown in Fig. 17.

The shaft 262 before referred to, has also mounted on it rock arms 261, one on each side of the plate 237 of the multiplying mechanism, which rock arms are connected to links 260, said links supporting at their upper ends the lowering bar 259 on which the vertical portions of the lowering bars 247 are supported. It might be well to state here that in this construction, whenever the handle is operated, the bar 259 is lowered and then raised, permitting the downward movement and raising all of the parts it controls.

In the multiplication of any number, the product must contain units alone, or units and tens; as, for instance, when "4" is multiplied by "9," the product contains three tens and six units; when "5" is multiplied by "9," the product contains four tens and five units; and when "6" is multiplied by "9," the product contains five tens and four units. When, however, "2" is multiplied by "2," there are no tens but four units. If there are no tens in the product, or if there is one or more tens in the product, or one or more units in the product, or no units in the product, the multiplying plates are so constructed that by their shoulders they will properly position the arms 247 irrespective of the particular pair of pendants which may be supported by said arms.

The "9" multiplying plate which is selected, lifted and held up-lifted above its companions in the performance of the example under consideration, is, as shown in Fig. 73, provided with a series of shoulders which are marked units and tens respectively, brackets being employed under said shoulders to indicate the two shoulders which coöperate with a pair of coupled pendants in any multiplying operation. In the example under consideration the "4" which has been moved to the fourth position in the units column would have its units pendant located over the tens shoulder (marked 3 in Fig. 73), and the units pendant over the units shoulder marked "6" in the fourth position.

In Fig. 64ª I have illustrated the position the parts assume when the example under consideration is set up in the multiplying devices, the "9" multiplier key pressed, and the handle pulled forward. In this figure it will be seen that the two cross arms 247 at the left identified with the pair of pendants moved to the sixth position and controlling the units slide bar, rest upon the 5 and 4 tens and units shoulders of the "9" multiplying plate, which means that the tens partial product stop bar will arrest its controlled rack 438 in the "5" position to register 5 tens, and that the units partial product stop bar 239 will arrest its rack to indicate 4 in the next adjacent wheel 268 of lower order than the one operated by the tens rack. The two middle cross arms are upon shoulders 4 and 5, which means that the tens rack 438 controlled thereby will move forward four teeth before being arrested, and the units rack five teeth before being arrested. The two bars at the right are arrested on shoulders 3 and 6, meaning that the tens rack will be arrested at the third tooth and the units rack arrested at the sixth tooth. The register wheels 268 which are actuated by the tens racks 438 in the example under consideration are those wheels which are located in the tens, units and tenths columns, whereas the register wheels 268 which are rotated by the units rack are located in the units, tenths and hundredths columns, so that upon completion of the handle operation the wheels 268 would stand at 58.86.

When the parts are in the position shown in Fig. 64ª the tens partial product racks have been permitted to be moved until arrested by the shoulders 5, 4, and 3 on the arms 243ª, which have been placed in their paths, said wheels, as before stated, being located in the tens, units and tenths columns respectively. As the handle starts on its rearward movement it depresses the wheels 268 out of engagement with the racks 438 and into engagement with the racks 453, which racks 453, like the racks 125 heretofore described, are slidably mounted on their supporting slide bars and so as to effect carrying.

The forward pull of the handle in introducing the tens partial products into the wheels 268 has also moved such of the slide bars 100, 100ª-b-c-d which are permitted to move by the lowering of their controlling stop shoulders on the arms 243. All of the remaining arms 243 are depressed slightly in the operation of multiplying so as to place the zero shoulder in front of the projections 242 and prevent movement of the idle slide bars or higher order, as described in my former patent.

Thus, when the handle is moved forward to introduce the tens partial products into the wheels 268, the restoring bar 104 will likewise move forward and permit such of the slide bars 100, 100$^{a-b-c-d}$ to move forward as are necessary in the computation of the example being performed on the machine, and when the wheels 268 are thrown into mesh with the racks 453, upon the initial rearward movement of the handle, the restoring bar 104 will pick up all of the displaced slide bars, and in restoring them home rotate the meshed wheels 268 and add therein the units partial products to the tens partial products previously introduced on the forward movement of the same stroke of the handle.

Of course, when the handle approaches its home position the bar 259 will be raised so as to restore all of the arms 247 and their carried parts to their elevated positions, and the 9 multiplying plate which was raised upon the depression of the 9 multiplier key will be dropped to its normal position. If it is desired to continue the multiplcation of this same multiplicand by another digit or digits they are successively depressed, and the handle pulled once for each key so depressed the product totalizer being automatically stepped one space to the left at each handle pull.

*The carrying mechanism of the product totalizer.*

Wheels 268 shown in the accompanying drawings contain twenty teeth and are therefore larger in diameter than the corresponding wheels of my former patent. Each wheel 268 in the present case is provided with two tripping projections, and these tripping projections as they pass under a tripping pawl 454 will vibrate said tripping pawl, in the form of a bell crank lever, and cause a pin 455 on the lower end thereof to operate a restraining pawl 456 by engaging the cam face 457 thereof. This restraining pawl has a rearwardly extending finger 458 which normally lies in front of the bent end of a lever 459, said bent end of lever 459 also engaging the upper end of the stop bar 239$^a$. When the restraining pawl 456 is depressed, as shown in Fig. 8, the lever 459 permits the upper end of the next adjacent stop bar of higher order to be moved forward a distance of one tooth by means of the spring 440 connected to the rack 438; hence, when a pawl 454 is tripped it releases the lever 459 and permits the next adjacent rack of higher order the distance of one tooth and actuates its meshed wheel 268 the distance of one tooth so as to effect the carrying. When the wheels 268 are disengaged from the racks 438 the restoring bar 442 will restore said racks, and by so doing cause a pin 460 on each rack to engage all of the displaced levers 459 and restore said levers to their normal positions behind the fingers 458.

In Fig. 9 I have shown the parts in the position they occupy at the time the pin 460 is forcing the lever 459 rearwardly and before the parts are moved to the position shown in Fig. 5.

The above described carrying mechanism of wheels 268, which at the time that the racks 438 are in engagement therewith employ said racks to actuate the next adjacent wheel of higher order, also coöperates with a movable rack 453 to effect the actuation of the next adjacent adding wheel of higher order through the medium of said racks when they are in mesh with the wheels 268. The wheels 268, as shown in Fig. 36, are mounted in a vertically swinging frame 270 pivoted on a rod 271, in which swinging frame is arranged the rod on which the tripping pawls 454 and restraining pawls 456 are mounted. Hence, when the wheels 268 are depressed into engagement with racks 453 the lateral projections 461 and the depending finger 462 of the restraining pawl are rendered operative with respect to their associate parts.

I will now describe the operation of the carrying mechanism when the racks 453 are in mesh with the wheels 268: The tripping pawl 454 will actuate the restraining pawl 456 in exactly the same way as heretofore described, but in the present case the lateral projection 461 will become engaged with a hook 463 whereby the restraining pawl 456 will be held with its depending finger 462 projected forwardly.

464 indicates a bell crank lever whose upwardly extending member lies in the path of the finger 462, and whose forwardly extending member engages the shoulder on the rack 453 and holds said rack forwardly against the energy of its spring 465, said spring tending to move said rack rearwardly a distance of one tooth. The positioning of the pawl 456 may occur at any time the slide bars are at home or in advanced position. In the event that the slide bar is in advanced position, as shown in Fig. 10, the restoration of the slide bar will cause the bell crank lever 464 to engage the forwardly projecting finger 462 and release the rack 453 identified with the next adjacent adding wheel of higher order, whereby said wheel of higher order will be moved a distance of one tooth. As the restoring bar 104 continues its rearward movement, a pin 466 engages the lever 463 and pushes said lever off the projection 461 so as to permit the restraining pawl to rise.

422 is a restoring arm (see Figs. 5, 13, 16 and 53), which restoring arm extends transversely from a slide bar 420ª similar in all respects to the slide bar 420 which carries the restoring arm 421 for the racks 125. The slide bar 420ª which carries the arm 422 for restoring the racks 453 has, like the slide bar 420 heretofore described, a slot and pin connection with a lever 423ª carrying a tappet 424ª at its lower end (like the parts 423 and 424 heretofore described, and illustrated in Figs. 53 and 54). The tappets 424 and 424ª (as shown in Fig. 16) lie side by side, the former coöperating with the projection 425 when the cam plate 82 is in its normal position, so that the restoring arm 421 will be vibrated at each stroke of the handle (the arm 422 remaining at rest). When, however, the cam plate 82 is shifted to the third position, as in the operation of multiplying, the projection 425 thereon is brought into coöperative relation to the tappet 424ª, and at each stroke of the handle in the operation of multiplying the arm 422 is vibrated (the arm 421 remaining at rest).

Referring to Figs. 36 to 39, it will be seen that when the cam 109 is shifted to the third position in the operation of multiplication the tappet 406 thereof coöperates with pin 470 on the end of a bell crank lever 471, whose upper end has a slot and pin connection with a sliding bar 472. The bar 472 has an opening 473 with a cam face in its forward, upper edge, similar in all respects to the opening 411 heretofore described. This cam face coöperates with a pin 474 on the frame 270 which carries the wheels 268. When the handle is at home, the pin is in the forward enlarged portion of the opening, and the wheels 268 are in mesh with the racks 438 during the forward movement of the handle, as shown in Fig. 36. When the handle reaches the forward limit of its movement the tappet 406 engages the pin 470 (as shown in Fig. 37), and shifts the bar 472 rearwardly (as shown in Fig. 39) so as to depress the frame 270 and hold the wheels 268 in mesh with the racks 453 during the rearward movement of the handle. As the handle approaches the limit of its rearward movement the cam face 419 engages the pin 470 and shifts the plate 472 so that the spring 475 will lift the wheels 268 out of mesh with the racks 453 and into mesh with the racks 438.

*Taking the product from the rear totalizer.*

To obtain the product from the rear totalizer the " P " key is depressed and the handle pulled once. To retain the product on the rear totalizer the " P " key is held down while the handle moves rearwardly.

By referring to Fig. 42 it will be seen that the " P " key is connected to a rod 302, which rod, at its rear end, is connected to a lever 303 having an extension 304 arranged above the pin 183 whereby when the " P " key is depressed the rod 185 is likewise depressed and the tappet 84 raised out of the path of the pin 83. Consequently, the track frame 58 which supports the traveling carriage is not lifted up so as to operate the stop pins 93. A bar 305 is connected to lever 303, and this bar has a projection 306 which coöperates with the plate 176, whereby the " P " key is held in its depressed position until the handle reaches the limit of its forward movement when said plate, as before described, is vibrated and the " P " key is released.

The rear end of bar 305 is connected to a lever 307, which lever has a forward extension 308 lying above pin 309 on the lower end of bar 272. Thus when the " P " key is depressed the bar 272 is likewise depressed, lowering the rear totalizer frame 270 and forcing the totalizer wheels into mesh with their racks 453. Lever 307 is provided with a rearward extension 310, which rearward extension lies under pin 223 on rock arm 221 mounted on shaft 220 (see Figs. 35 and 49). Thus, when the " P " key is depressed shaft 220 is rocked and lever 219ª raises all of the pendants 235 and 235ª, but not sufficiently high to engage them with the slide bars.

All of the pendants are thus lifted above the bars 247, and consequently if the " P " key is permitted to rise when the handle reaches the forward limit of its movement all of the pendants 235 and 235ª will be restored to zero position. The means for restoring the pendants 235ª consists of a bell crank lever 311 (see Fig. 16), whose lower member is located over the rearward extension 310 of a lever 307, and whose upper member 312 engages a sliding collar 313 mounted on a shaft 106, said collar having an extension which engages an arm 314 in whose end is mounted a restoring bar 315 (see Fig. 17 and 59). This restoring bar is located in front of the pendants 235 and 235ª. Collar 313 also carries an arm 317 (see Fig. 34), which, when the bell crank lever referred to is rocked, is placed in the path of a pin 318 mounted in an extension of the cam 82 (see Fig. 34). When the handle is pulled the pin 318 engages arm 317 and moves the restoring bar 315 rearwardly, which restoring bar moves all of the pendants back to zero position.

The product in the rear totalizer is printed, and if the " P " key is permitted to rise when the handle reaches the extremity of its forward movement the wheels 268 will stand cleared. If the " P " key is held depressed by the operator until the handle returns to its rear position, it is obvious that the rear totalizer wheels will be kept in mesh with the racks, and the amount of the product re-registered therein. Pressing the " P " key, however, and pulling the handle always restores the pendants to position in readiness for another operation. The bar 259 heretofore described, which lowers and raises the stop bars 239 and 239ª, provides a support for the lever 219ª above described, as shown in Fig. 50; but the bar 259 has movement independent of the link which operates the lever 219ª, said link being bent over the forward end of the bar, as shown in Fig. 50.

Referring to Fig. 42, it will be observed that the extension 310 is cut away where it passes under the member 180 of the bell crank lever which operates the plate 109 and the cam 82. Thus, when the "P" key is depressed these parts are not disturbed and consequently the product which appeared in the rear totalizer, which is printed, is registered in the forward totalizer.

*The error key.*

The error key (see Fig. 4) is connected by a rod 206 to the rack bar 197 performing the functions described in my aforesaid patent.

*Preventing unnecessary forward movement of the rack bars in taking a total.*

In my former patent the pawls 208 which coöperated with the teeth of the rack bars were located above said bars. In my present construction, as shown in Figs. 5, 56, 57 and 58, these pawls 208 coöperate with teeth on the undersides of the slide bars, but the pawls are operated in identically the same way as in my former patent.

Having thus described the invention, what is claimed as new and desired to be secured by Letters Patent is:

1. In a calculating machine, the combination with a plurality of totalizers revolving in concentric paths, of actuating devices therefor, and a common locking means for all of said totalizers; substantially as described.

2. In a calculating machine, the combination with a plurality of revoluble totalizers, of actuating devices therefor, a common locking means for all of said totalizers, and means for moving a selected totalizer out of engagement with said locking means and into engagement with said actuating devices; substantially as described.

3. In a calculating machine, the combination with a plurality of revoluble totalizers, of actuating devices therefor, and an element medially arranged with respect to said totalizers for locking them against movement; substantially as described.

4. In a calculating machine, the combination with a plurality of revoluble totalizers, of actuating devices therefor, and means for moving said totalizers radially with respect to their center of revolution; substantially as described.

5. In a calculating machine, the combination with a plurality of revoluble totalizers, of actuating devices therefor, locking means for said totalizers, springs for holding said totalizers in engagement with said locking means and means for moving said devices out of engagement with said locking devices and into engagement with said actuating devices; substantially as described.

6. In a calculating machine, the combination with a revoluble totalizer carrier provided with radially disposed slots, and separate groups of totalizer wheels mounted on shafts whose ends extend through said radially disposed slots; substantially as described.

7. In a calculating machine, the combination with a series of revoluble totalizers mounted in a suitable carrier and whose shafts project beyond said carrier, of actuating devices therefor, and depressible elements for coöperating with said projecting ends to cause the said totalizers to engage with the actuating devices as said shaft ends are successively brought under control of said depressible elements; substantially as described.

8. In a calculating machine, the combination with a totalizer carrier, a series of independent totalizers mounted in said carrier and capable of being revolved about the center, actuating devices for said totalizer, said totalizers comprising suitable wheels mounted on shafts, the ends of which shafts project beyond the ends of the carriers, and means for engaging the protruding shaft ends to move the selected totalizer into engagement with said actuating devices; substantially as described.

9. In a calculating machine, the combination with a totalizer, of actuating devices therefor, means for causing engagement between said totalizer and said actuating devices, said means comprising a rockable element, a tappet carried by said rockable element, and a lever coöperating with said tappet, said rockable element being also provided with a cam face for coöperating with said lever to effect disengagement between said totalizer and the actuating mechanism; substantially as described.

10. In a calculating machine, the combination with a plurality of revoluble totalizers, actuating devices therefor in the form of bars, displaceable racks carried by said bars and designed to coöperate with any one of said totalizers, means for determining the excursions of said bars, a paper carriage and connections for moving a selected totalizer into and out of engagement with said racks, and means for displacing said racks while in engagement with said selected totalizer whereby carrying is effected.

11. In a calculating machine, the combination with a plurality of revoluble totalizers, actuating devices therefor comprising rack carriers, means for determining the excursions of movement of said carriers, racks on said carriers which are displaceable with respect to the carriers to effect carrying in a set of totalizer wheels in engagement therewith, means for moving a selected group of totalizer wheels into and out of engagement with said racks, and an element medially arranged with respect to said totalizers for locking them against movement when out of engagement with said racks.

12. In a calculating machine, the combination with a totalizer, of displaceable toothed elements coöperating therewith, carrying devices for effecting the displacement of said toothed elements in the operation of carrying, means for restoring said carrying devices, a total key, and means operated by said total key for preventing the operation of said restoring means in total-taking operations whereby it is unnecessary to make an extra handle stroke before taking a total.

13. In a calculating machine, the combination with a totalizer, of displaceable toothed elements coöperating therewith and normally disengaged therefrom, carrying devices for effecting the displacement of said toothed elements in the operation of carrying, means for restoring said carrying devices, a total key, printing type whose position is controlled by said toothed elements in the total-taking operation, said printing type remaining relatively stationary upon the displacement of said toothed elements in the carrying operation, and means controlled by the total key for rendering the above-mentioned means ineffective in total-taking operations, whereby the displaced toothed elements will properly operate, enabling them to give a correct total without necessitating the making of an extra handle stroke.

14. In a calculating machine, the combination with a totalizer, toothed elements for actuating the same, means for displacing said elements in the operation of carrying, means for restoring said displaced elements, and a total key for rendering said restoring means inoperative; substantially as described.

15. In a calculating machine, the combination with a series of revoluble totalizers, a laterally movable carriage, and means controlled by said carriage for effecting a partial revolution of said totalizers; substantially as described.

16. In a calculating machine, the combination with a plurality of revoluble totalizers, a carrier in which the same are mounted, a laterally shiftable carriage, and means controlled by said carriage for effecting a partial revolution of said carrier; substantially as described.

17. In a calculating machine, the combination with a plurality of revoluble totalizers, a carrier therefor, escapement mechanism coöperating with said carrier, and a laterally shiftable carriage for operating said escapement mechanism; substantially as described.

18. In a calculating machine, the combination with a plurality of revoluble totalizers, a carrier therefor, a spring tending at all times to rotate said carrier in one direction, an escapement mechanism for controlling said rotation, a laterally shiftable carriage for operating said escapement mechanism, and means operated by said carriage for rotating said carrier against the action of its spring; substantially as described.

19. In a calculating machine, the combination with totalizer-actuators, multiplying mechanism including independently movable parts which are capable of being positioned to set up a number in the multiplying devices, and means for coupling said totalizer-actuators and said movable parts in the multiplying mechanism to position the latter; substantially as described.

20. In a calculating machine, the combination with a keyboard, independently movable pendants and means whereby said pendants may be positioned to indicate a number set up on said keyboard and multiplying plates coöperating with said pendants.

21. In a calculating machine, the combination with actuating devices, of multiplying devices including parts capable of being positioned to set up a number in said multiplying devices, and means for coupling said actuating devices of a given order with said parts in the multiplying devices of lower order; substantially as described.

22. In a calculating machine, the combination with actuating devices, of multiplying devices, parts in said multiplying devices which are positioned by said actuating devices in setting up a number in said multiplying devices, and means whereby the actuating devices identified with whole numbers are coupled with parts in the multiplying devices identified with decimals; substantially as described.

23. In a calculating machine, the combination with totalizers and their actuating devices, of multiplying devices, and means for setting up numbers in said multiplying devices by transfer through the medium of said actuating devices from said totalizers, the parts set up in the multiplying devices being automatically reduced two orders; substantially as described.

24. In a calculating machine, the combination with a key board, actuating devices, multiplying devices, and means for directly setting up numbers from the key board in said multiplying devices, and means for automatically lowering the order of the numbers so set up; substantially as described.

25. In a calculating machine, the combination with a totalizer and actuating devices therefor for computing digits as whole numbers, and multiplying devices in which said numbers may be introduced, and means for lowering the order of numbers introduced into the multiplying devices, whereby they are computed in said multiplying devices as decimals; substantially as described.

26. In a calculating machine, the combination of totalizers, two sets of actuating devices therefor, and variably positioned stops for controlling the movement of each set of actuating devices.

27. In a calculating machine, the combination of a totalizer and two independently operable sets of actuating devices therefor for successively coöperating with said totalizer in multiplying operations, substantially as described.

28. In a calculating machine, the combination of a totalizer, two sets of actuating devices for successively coöperating therewith, and independent means for controlling the movement of said actuating devices in multiplying operations, substantially as described.

29. In a calculating machine, the combination of a totalizer, two sets of actuating devices for successively coöperating therewith, independent means in the form of variably positioned stops for controlling the movement of said actuating devices, and common means for positioning said controlling devices, substantially as described.

30. In a calculating machine, the combination with a main shaft, a totalizer, two sets of actuating devices therefor, one of which is effective on the forward stroke of the main shaft, and the other of which is effective on the back stroke of the main shaft, substantially as described.

31. In a calculating machine, the combination with a main shaft, a totalizer, independently movable racks for coöperating therewith, independently positioned stops for controlling the movement of said racks, and means whereby one set of racks is effective on the forward stroke of the main shaft, and the other set of racks is effective on the back stroke of the main shaft, substantially as described.

32. In a calculating machine, the combination with a totalizer, two sets of actuating devices therefor, and carrying devices which are operable with respect to both sets of actuating devices; substantially as described.

33. In a calculating machine, the combination with a totalizer, two sets of actuating devices therefor, and a single set of carrying devices which coöperates with the two sets of actuating devices; substantially as described.

34. In a calculating machine, the combination with a totalizer, two sets of actuating devices therefor, said actuating devices being in the form of displaceable racks, and a single set of carrying devices for coöperating with said displaceable racks, and means whereby when said carrying devices are coöperating with one set of racks they are rendered inoperative with respect to the other set of racks; substantially as described.

35. In a calculating machine, the combination with a totalizer, of two sets of actuating racks therefor, variably positioned stops for each set of actuating devices, and independently-operated restoring means for said actuating racks; substantially as described.

36. In a calculating machine, the combination with a totalizer, two sets of actuating racks therefor, springs tending to pull said racks forwardly, stops for arresting the position of the racks, restoring bars for permitting the forward movement of said racks, said restoring bars eventually moving said racks rearwardly to their home position, and means for shifting the totalizer from engagement with one set of racks into engagement with the other set of racks; substantially as described.

37. In a calculating machine, the combination with a totalizer, two sets of actuating racks therefor, said racks being capable of displacement in the carrying operation, a single set of carrying devices coöperating with said totalizer and both sets of racks, and means for restoring said racks after displacement in the carrying operation; substantially as described.

38. In a calculating machine, the combination with a totalizer, of actuating racks therefor, said racks being capable of displacement in the carrying operation, carrying devices coöperating with said totalizer and said racks, and means for restoring said displaced racks, said means comprising an arm, a lever for moving said arm, a tappet on the end of said lever, and a rockable element coöperating with said tappet; substantially as described.

39. In a calculating machine, the combination with a totalizer, of two sets of racks coöperating therewith, and means for selecting the active coöperating racks, whereby one of said racks will coöperate with a higher order than the other of said racks; substantially as described.

40. In a calculating machine, the combination with a totalizer, of two sets of separately movable complementary racks coöperating therewith, and means for operating the racks and so controlling their movements that tens and units partial products are introduced into the totalizer.

41. In a calculating machine, the combination with a totalizer, of tens and units partial product racks for successively coöperating with said totalizer, said racks being separately movable complementary to each other and under common control; substantially as described.

42. In a calculating machine, the combination with a totalizer, of two sets of separately movable racks for introducing tens and units partial products thereinto, means for shifting the totalizer so as to successively engage the same with said racks; substantially as described.

43. In a calculating machine, the combination with a totalizer, of separately movable racks which are complementary to each other for introducing tens and units partial products into said totalizer by respectively coöperating with the wheels of different orders therein, a main shaft and means for contemporaneously controlling the movement of said racks whereby the operation of multiplying may be effected by a single operation of said shaft, substantially as described.

44. In a calculating machine, the combination with a totalizer, of two sets of independently movable racks for introducing, respectively, tens and units partial products into said totalizer, a main shaft and means whereby one set of racks is effective on the forward movement of the main shaft, and the other set of racks effective on the back movement of the main shaft, whereby the operation of multiplication is completed by a single operation of said shaft, substantially as described.

45. In a calculating machine, the combination with a slide bar, and two pendants which are capable of being positioned thereby to set up a multiplicand; substantially as described.

46. In a calculating machine, the combination with a slide bar, two pendants which are capable of being positioned thereby, tens and units partial product stop bars with which said pendants are identified, and a multiplier plate having tens and units partial product shoulders for coöperating with said stop bars respectively; substantially as described.

47. In a calculating machine, the combination with multiplier keys, and a plate capable of being positioned thereby, said plate having tens and units partial product shoulders; substantially as described.

48. In a calculating machine, the combination with multiplier keys, of a series of multiplier plates identified with the several multiplier keys, and means whereby when a key is operated the selected plate is moved to an operative position and there held; substantially as described.

49. In a calculating machine, the combination with a series of digit multiplier keys, digit multiplier plates having tens and units partial product shoulders, and means for lifting and holding in an elevated operative position the selected multiplying plate; substantially as described.

50. In a calculating machine, the combination with a key board, of tenths and hundredths decimal elements normally beyond control of said key board, and means for bringing the tenths decimal element under control of said key board, said means acting automatically to place the hundredths decimal element under control of said key board; substantially as described.

51. In a calculating machine, the combination with a key board, of tenths and hundredths decimal elements normally beyond the control of said key board, means for bringing the tenths decimal element under control of said key board, said means, if retained in operative position, automatically bringing the hundredths decimal element under control of said key board; substantially as described.

52. In a calculating machine, the combination with a key board, of lifting bars operated thereby, a traveling carriage, stop pins in said carriage which are positioned by said lifting bars, and means for shifting said lifting bars so as to place them in control of a series of stop pins normally beyond control thereof; substantially as described.

53. In a calculating machine, the combination with digit keys, of lifting bars operated thereby, a traveling carriage, stop pins in said carriage, an escapement mechanism whereby the carriage is caused to travel step by step and bring said stop pins successively under control of said lifting bars, means for arresting the travel of the carriage so as to bring the tenths decimal rack bar under control of said stop pins, and means for shifting said lifting bars so as to bring the hundredths decimal rack bar under control of said stop pins; substantially as described.

54. In a calculating machine, the combination with a totalizer, independently movable tens and units partial products racks coöperating therewith, and means for preventing the operation of one set of said partial products racks at the time that the other set of racks is operative.

55. In a calculating machine, the combination with a plurality of groups of totalizer wheels, actuating devices therefor comprising rack carriers having displaceable racks arranged thereon at different points for coöperation with said groups of totalizer wheels, respectively, to separately and independently introduce items therein and means under control of the operator for transferring the number registered in either group to the other.

56. In a calculating machine, the combination of actuating devices, a revoluble series of independently operable totalizers coöperating therewith, a paper carriage, and means under the control of said paper carriage for revolving said totalizers into and out of position with respect to said actuating devices.

57. In a machine of the character described, the combination of a reciprocating prime mover, register wheels; actuators therefor; and multiplicand and multiplier setting up devices controlling movement of said actuators, the latter adapted during the stroke of the prime mover in one direction to register units of one product and during the stroke of the prime mover in the opposite direction to register tens of the product.

58. In a machine of the character described, the combination of accumulator wheels denominationally arranged, manipulative amount determining devices, and duplex actuators alternately effective and arranged in pairs for adjacent wheels, the said amount determining devices including indexing means to differently measure excursions of the two actuators of a pair.

59. In a machine of the character described, the combination of a pair of wheels, a reciprocatory actuator for one of them, a similar actuator for the other reversely related thereto,—the two actuators being adapted to move together in the same direction and one wheel being engageable with the actuator during movement thereof in one direction while the other wheel is disengaged from its actuator and the latter wheel being engageable with its actuator during the reverse movement while the first mentioned wheel is disengaged from its actuator, whereby the two wheels are successively turned in the same direction during one concurrent reciprocation of the two actuators; and multiplicand and multiplier setting up devices measuring excursions of the actuators;—the one to register the units of a product upon its wheel and the other to register the tens of the product on its wheel.

60. In a machine of the character described, the combination of a pair of gear wheels axially alined, reciprocatory actuating racks on opposite sides of said gear wheels, one rack alined to mesh with one such wheel and the other rack alined to mesh with the other wheel and the wheels and racks being relatively movable for alternate engagement of one wheel and rack and the other wheel and rack; two sets of manipulative amount determining devices; and stop members jointly controlled thereby and coöperating with both racks simultaneously to measure advance of one in mesh with its wheel and of the other disengaged from its wheel, said latter rack adapted to return meshed with said wheel while the other rack returns disengaged from its wheel.

61. In a machine of the character described, the combination of accumulator wheels denominationally arranged, manipulative amount determining devices, and two sets of actuators reversely related to the wheels and arranged in pairs for adjacent wheels, the said amount determining devices including indexing means to differently measure excursions of the two actuators of a pair.

62. In a machine of the character described, the combination of a set of pinions denominationally arranged, rack bars with their racks on opposite sides of said pinions and arranged in pairs for adjacent pinions, means for engaging and disengaging racks and pinions and reciprocating the rack bars to advance a pinion by initial movement of a rack of a pair and advance the adjacent pinion by return movement of the other rack of said pair, manipulative amount-determining means including indexing devices to differently measure excursions of rack bars of the same pair, a third set of racks carried by one of the said set of bars, a second set of pinions, and means for engaging and disengaging the same and said third set of racks.

63. In a machine of the character described, the combination of a set of pinions denominationally arranged, rack bars with their racks on opposite sides of said pinions and arranged in pairs for adjacent pinions, means for engaging and disengaging racks and pinions and reciprocating the rack bars to advance a pinion by initial movement of a rack of a pair and advance the adjacent pinion by return movement of the other rack of said pair, a set of indexing plates for each pair of rack bars, each plate being formed with a double series of differentially graduated stops for the bars to encounter, keys for the plates of a set respectively, and means for variously limiting movement of the plates released by the keys.

64. In a machine of the character described, the combination of a set of pinions denominationally arranged, rack bars with their racks on opposite sides of said pinions and arranged in pairs for adjacent pinions, means for engaging and disengaging racks and pinions and reciprocating the rack bars to advance a pinion by initial movement of a rack of a pair and advance the adjacent pinion by return movement of the other rack of said pair, manipulative amount-determining means including indexing devices to differently measure excursions of rack bars of the same pair, a third set of racks carried by one of the said sets of bars, a second set of pinions, and means for engaging and disengaging the same and said third set of racks; together with transfer mechanisms comprising mounting for the racks permitting one-step movement thereof, and detents for releasing the racks, said detents tripped by the pinions.

65. In a machine of the character described, the combination of accumulator wheels denominationally arranged, manipulative amount determining devices, and duplex actuators alternately effective and arranged in pairs for adjacent wheels, the said amount determining devices including indexing means to differently measure excursions of the two actuators of a pair; together with type carriers connected to one set of actuators only.

66. In a machine of the character described, the combination of accumulator wheels denominationally arranged, manipulative amount determining devices, and two sets of actuators reversely related to the wheels and arranged in pairs for adjacent wheels, the said amount determining devices including indexing means to differently measure excursions of the two actuators of a pair; together with type carriers connected to one set of actuators only.

67. In a machine of the character described, the combination of a set of pinions denominationally arranged, rack bars with their racks on opposite sides of said pinions and arranged in pairs for adjacent pinions, means for engaging and disengaging racks and pinions and reciprocating the rack bars to advance a pinion by initial movement of a rack of a pair and advance the adjacent pinion by return movement of the other rack of said pair, and manipulative amount-determining means including indexing devices to differently measure excursions of rack bars of the same pair; together with type carriers connected to the set of bars carrying racks which normally advance disengaging from the pinions.

68. In a machine of the character described, the combination of a set of pinions denominationally arranged, rack bars with their racks on opposite sides of said pinions and arranged in pairs for adjacent pinions, means for engaging and disengaging racks and pinions and reciprocating the rack bars to advance a pinion by initial movement of a rack of a pair and advance the adjacent pinion by return movement of the other rack of said pair, manipulative amount-determining means including indexing devices to differently measure excursions of rack bars of the same pair, a third set of racks carried by one of the said sets of bars, a second set of pinions, and means for engaging and disengaging the same and said third set of racks; together with type carriers connected to the bars carrying said third set of racks.

69. In a machine of the character described, the combination of a set of pinions denominationally arranged, rack bars with their racks on opposite sides of said pinions and arranged in pairs for adjacent pinions, means for engaging and disengaging racks and pinions and reciprocating the rack bars to advance a pinion by initial movement of a rack of a pair and advance the adjacent pinion by return movement of the other rack of said pair, and manipulative amount-determining means including indexing devices to differently measure excursions of rack bars of the same pair; together with a key and connections for reversing the order of engagement between racks and pinions whereby the latter remain in mesh during initial movement of bars with racks turning the pinions backward; substantially as and for the purpose described.

70. In a machine of the character described, the combination of a set of pinions denominationally arranged, rack bars with their racks on opposite sides of said pinions and arranged in pairs for adjacent pinions, means for engaging and disengaging racks and pinions and reciprocating the rack bars to advance a pinion by initial movement of a rack of a pair and advance the adjacent pinion by return movement of the other rack of said pair, manipulative amount-determining means including indexing devices to differently measure excursions of rack bars of the same pair, a third set of racks carried by one of the said sets of bars, a second set of pinions, and means for engaging and disengaging the same and said third set of racks; together with a key and connections for reversing the order of engagement between first-mentioned racks and pinions whereby the latter remain in mesh during initial movement of bars with racks turning the pinions backward while the third set of racks is disengaged from its pinions.

71. In a machine of the character described, the combination of a set of pinions denominationally arranged, rack bars with their racks on opposite sides of said pinions and arranged in pairs for adjacent pinions, means for engaging and disengaging racks and pinions and reciprocating the rack bars to advance a pinion by initial movement of a rack of a pair and advance the adjacent pinion by return movement of the other rack of said pair, manipulative amount-determining means including indexing devices to differently measure excursions of rack bars of the same pair, a third set of racks carried by one of the said sets of bars, a second set of pinions, and means for engaging and disengaging the same and said third set of racks; together with a key and connections for reversing the order of engagement between first-mentioned racks and pinions whereby the latter remain in mesh during initial movement of bars with racks turning the pinions backward while the third set of racks is disengaged from its pinions; and a key and connections for keeping the latter engaged with its racks during advance of the same while the first mentioned pinions are disengaged from their set of racks on the bars carrying the third set of racks.

72. In a machine of the character described, the combination of a set of pinions denominationally arranged, rack bars with their racks on opposite sides of said pinions and arranged in pairs for adjacent pinions, means for engaging and disengaging racks and pinions and reciprocating the rack bars to advance a pinion by initial movement of a rack of a pair and advance the adjacent pinion by return movement of the other rack of said pair, a depressible key rendering such means effective; type-carriers connected to the rack bars which normally advance with their racks disengaged from the pinions; impression means; and means for disabling the latter by said key.

73. In a machine of the character described, the combination of a set of pinions denominationally arranged, rack bars with their racks on opposite sides of said pinions and arranged in pairs for adjacent pinions, means for engaging and disengaging racks and pinions and reciprocating the rack bars to advance a pinion by initial movement of a rack of a pair and advance the adjacent pinion by return movement of the other rack of said pair, manipulative amount-determining means including indexing devices to differently measure excursions of rack bars of the same pair, a third set of racks carried by one of the said sets of bars, a second set of pinions, means for engaging and disengaging the same and said third set of racks; type-carriers connected to the bars carrying said third set of racks; impression means; and a key for preventing the engagement of said second set of pinions during return of their racks while the first set of pinions is also prevented from engaging its racks on the bars carrying the third set of racks; substantially as and for the purpose described.

In testimony whereof I hereunto affix my signature in the presence of two witnesses, this tenth day of December 1908.

HUBERT HOPKINS.

Witnesses:
F. R. CORNWALL,
GEORGE BAKEWELL.